United States Patent
Shirota (12)

(10) Patent No.: US 6,608,970 B1
(45) Date of Patent: Aug. 19, 2003

(54) ZOOM OPTICAL SYSTEM AND CAMERA USING THE SAME

(75) Inventor: Eiji Shirota, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/166,734

(22) Filed: Jun. 12, 2002

(30) Foreign Application Priority Data

Jun. 14, 2001 (JP) ......................... 2001-179767

(51) Int. Cl.$^7$ ............................. G03B 5/00; G02B 15/14
(52) U.S. Cl. ........................................ 396/72; 359/692
(58) Field of Search ............................. 396/72; 359/692

(56) References Cited

U.S. PATENT DOCUMENTS

| | | | | |
|---|---|---|---|---|
| 5,278,699 A | 1/1994 | Ito et al. | ...................... | 359/692 |
| 5,424,871 A | 6/1995 | Ito et al. | ...................... | 359/689 |
| 5,646,787 A | 7/1997 | Kamo | ...................... | 359/692 |
| 5,777,800 A | * 7/1998 | Yamaguchi et al. | ........ | 359/692 |
| 5,825,557 A | 10/1998 | Ohno | ...................... | 359/692 |
| RE36,326 E | 10/1999 | Ito et al. | ...................... | 359/692 |
| 6,172,819 B1 | 1/2001 | Enomoto et al. | ........... | 359/692 |
| 6,236,518 B1 | 5/2001 | Enomoto | ...................... | 359/692 |
| 6,268,966 B1 | 7/2001 | Ishii et al. | .................. | 359/692 |

FOREIGN PATENT DOCUMENTS

| | | | | |
|---|---|---|---|---|
| JP | 61-087120 | 5/1986 | ......... | G02B/15/163 |
| JP | 06-230282 | 8/1994 | ........... | G02B/15/16 |
| JP | 08-110468 | 4/1996 | ........... | G02B/15/16 |
| JP | 10-048523 | 2/1998 | ........... | G02B/15/16 |
| JP | 11-258503 | 9/1999 | ........... | G02B/15/16 |
| JP | 2000-066101 | 3/2000 | ........... | G02B/15/16 |
| JP | 2000-241703 | 9/2000 | ........... | G02B/15/16 |

* cited by examiner

*Primary Examiner*—W. B. Perkey
(74) *Attorney, Agent, or Firm*—Pillsbury Winthrop LLP

(57) ABSTRACT

A zoom optical system consists of, in order from the object side, a first lens unit (G1) with a positive refracting power and a second lens unit (G2) with a negative refracting power. In magnification change from the wide-angle end through the telephoto end, each lens unit is moved toward the object side in such a manner that a space between the first lens unit (G1) and the second lens unit (G2) decreases. The first lens unit (G1) consists of, in order from the object side, a first lens component (U1) with a positive refracting power, a second lens component (U2) with a negative refracting power, and a third lens component (U3) with a positive refracting power. The third lens component (U3) consists of a cemented-lens component. Also, the following condition (1) is satisfied:

$$f_T/f_W > 3 \qquad (1)$$

where $f_T$ is the focal length of the entire system in the telephoto-end position, and $f_W$ is the focal length of the entire system in the wide-angle end position. Whereby, a compact two-unit zoom optical system with good imaging quality and a camera using the same are provided with variable magnification ratio greater than 3 and telephoto ratio smaller than 0.85.

30 Claims, 14 Drawing Sheets

SPHERICAL ABERRATION

FNO 5.600

-1.00    1.00

DEF 0.00

ASTIGMATISM

FIY 21.63

-1.00    1.00

FIY 21.63
DEF 0.00

DISTORTION

FIY 21.63

-5.00    5.00

FIY 21.63
DEF 0.00

FNO 8.000

-1.00    1.00

DEF 0.00

FIY 21.63

-1.00    1.00

FIY 21.63
DEF 0.00

FIY 21.63

-5.00    5.00

FIY 21.63
DEF 0.00

FNO 12.800

-1.00    1.00

DEF 0.00

FIY 21.63

-1.00    1.00

FIY 21.63
DEF 0.00

FIY 21.63

-5.00    5.00

FIY 21.63
DEF 0.00

485.13 ----------
656.27 ----------
587.56 ——————

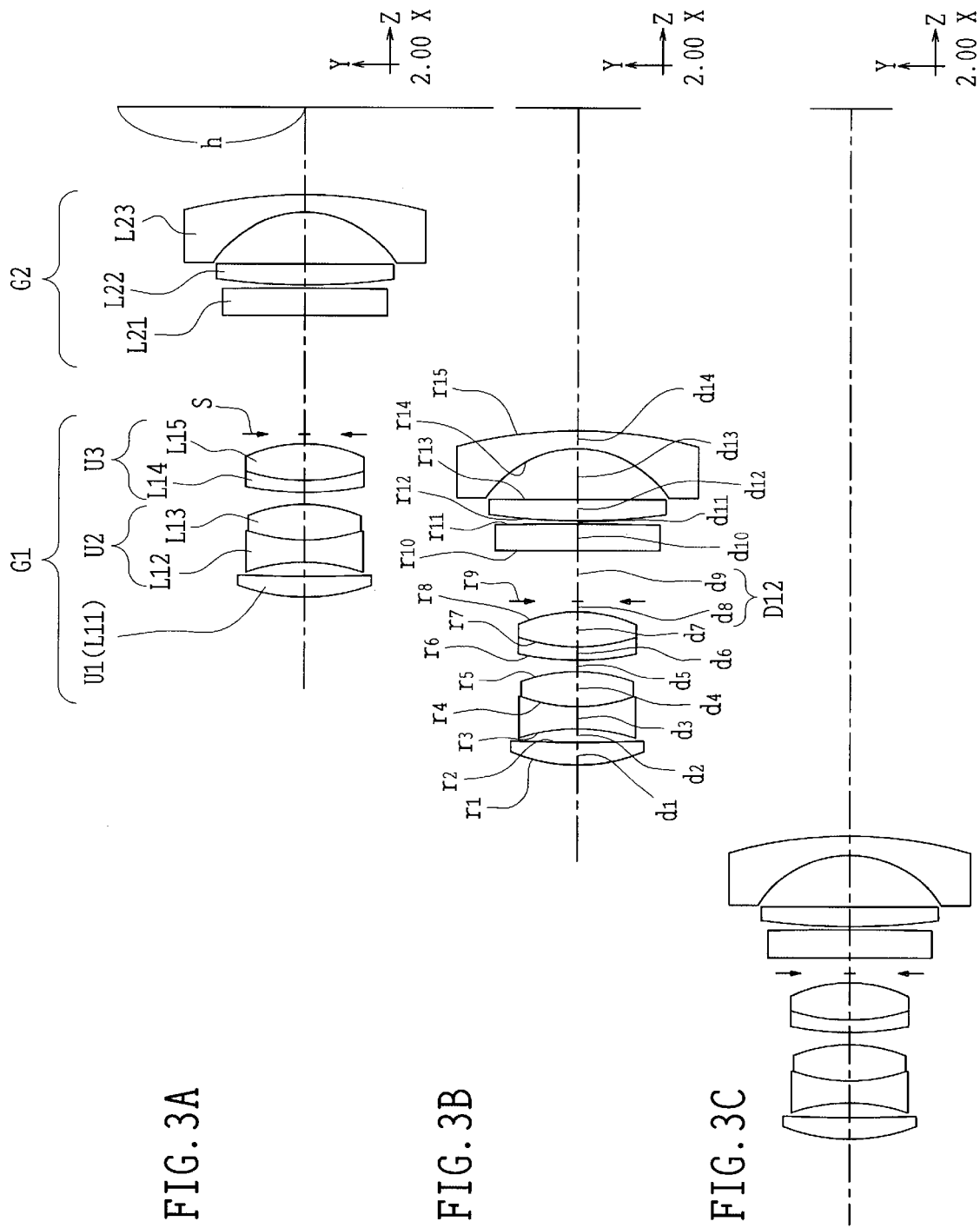

SPHERICAL ABERRATION

ASTIGMATISM

DISTORTION 485.13 ———
656.27 - - - - -
587.56 ———

SPHERICAL ABERRATION

FNO 5.600

-1.00　　1.00

DEF 0.00

ASTIGMATISM

FIY 21.63

-1.00　　1.00

FIY 21.63
DEF 0.00

DISTORTION

FIY 21.63

-5.00　　5.00

FIY 21.63
DEF 0.00

FNO 8.000

-1.00　　1.00

DEF 0.00

FIY 21.63

-1.00　　1.00

FIY 21.63
DEF 0.00

FIY 21.63

-5.00　　5.00

FIY 21.63
DEF 0.00

FNO 12.800

-1.00　　1.00

DEF 0.00

FIY 21.63

-1.00　　1.00

FIY 21.63
DEF 0.00

FIY 21.63

-5.00　　5.00

FIY 21.63
DEF 0.00

485.13 ———
656.27 - - - - -
587.56 ———

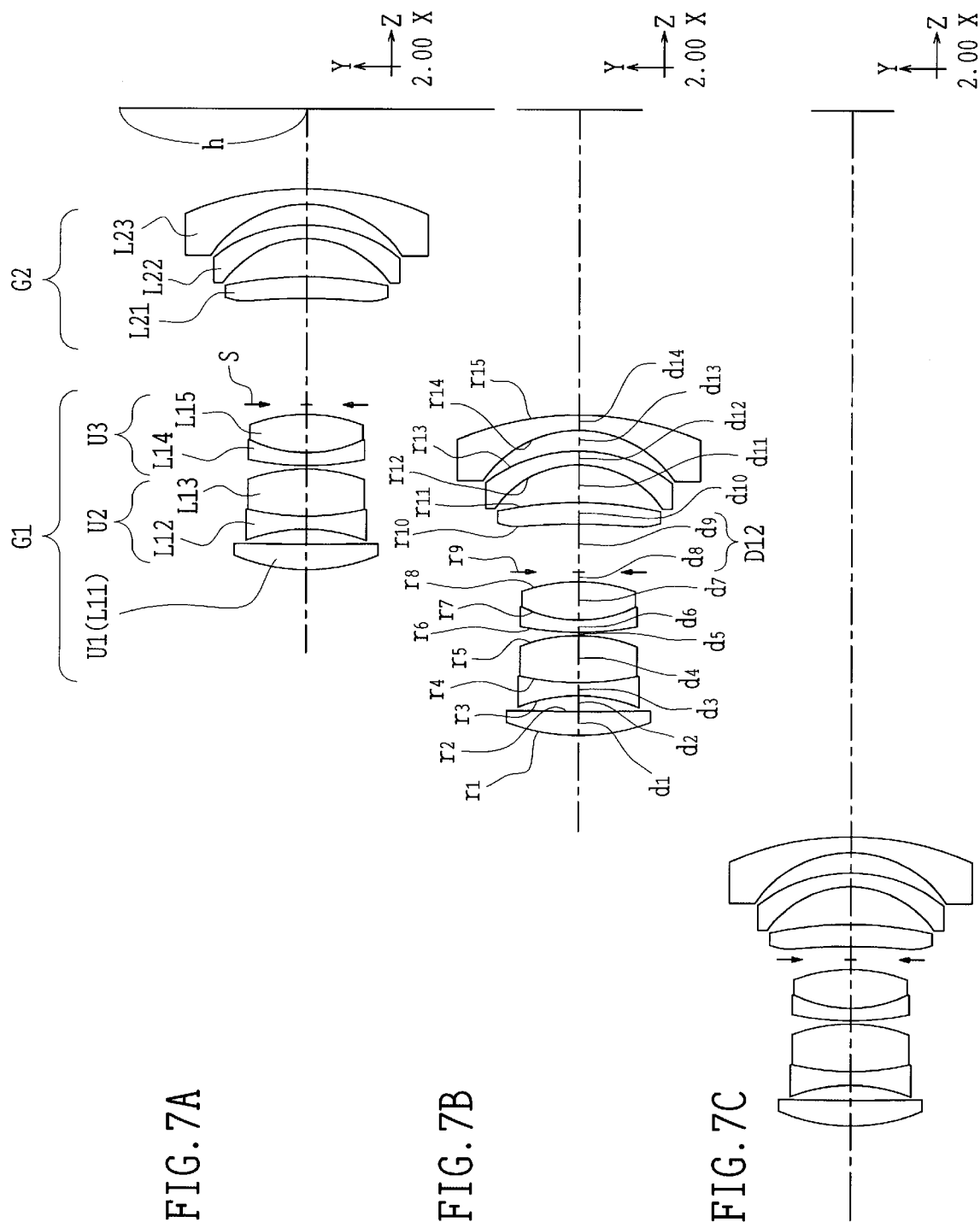

SPHERICAL
ABERRATION | ASTIGMATISM | DISTORTION
FIG.8A | FIG.8B | FIG.8C
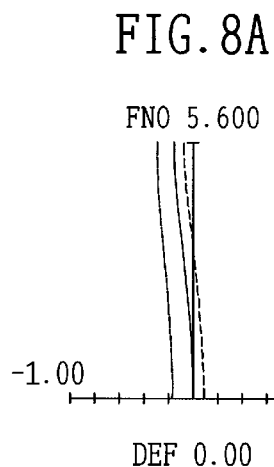
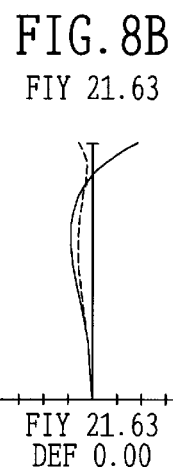
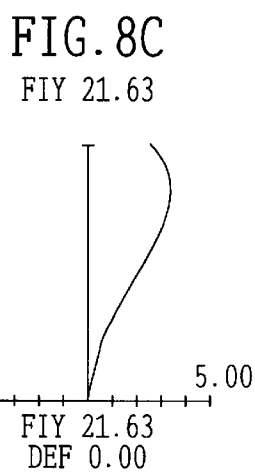
FIG.8D | FIG.8E | FIG.8F
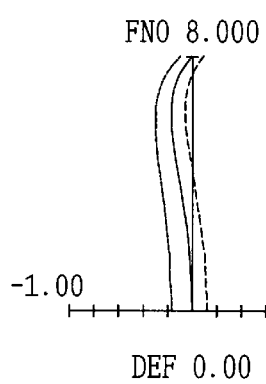
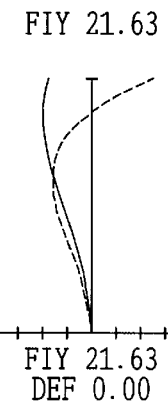
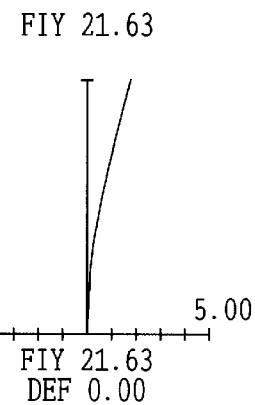
FIG.8G | FIG.8H | FIG.8I
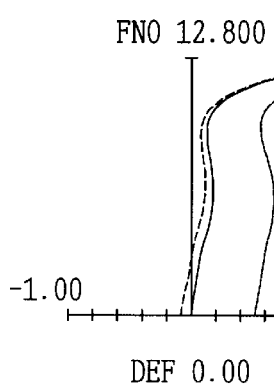
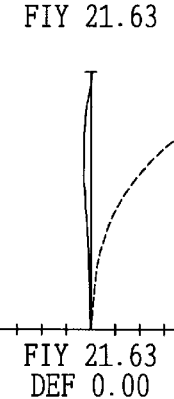
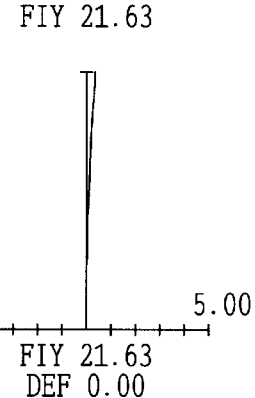
485.13 ——
656.27 --------
587.56 ——

SPHERICAL ABERRATION

FNO 5.600

−1.00    1.00

DEF 0.00

ASTIGMATISM

FIY 21.63

−1.00    1.00

FIY 21.63
DEF 0.00

DISTORTION

FIY 21.63

−5.00    5.00

FIY 21.63
DEF 0.00

FNO 8.000

−1.00    1.00

DEF 0.00

FIY 21.63

−1.00    1.00

FIY 21.63
DEF 0.00

FIY 21.63

−5.00    5.00

FIY 21.63
DEF 0.00

FNO 12.800

−1.00    1.00

DEF 0.00

FIY 21.63

−1.00    1.00

FIY 21.63
DEF 0.00

FIY 21.63

−5.00    5.00

FIY 21.63
DEF 0.00

485.13 ———
656.27 - - - - - -
587.56 ———

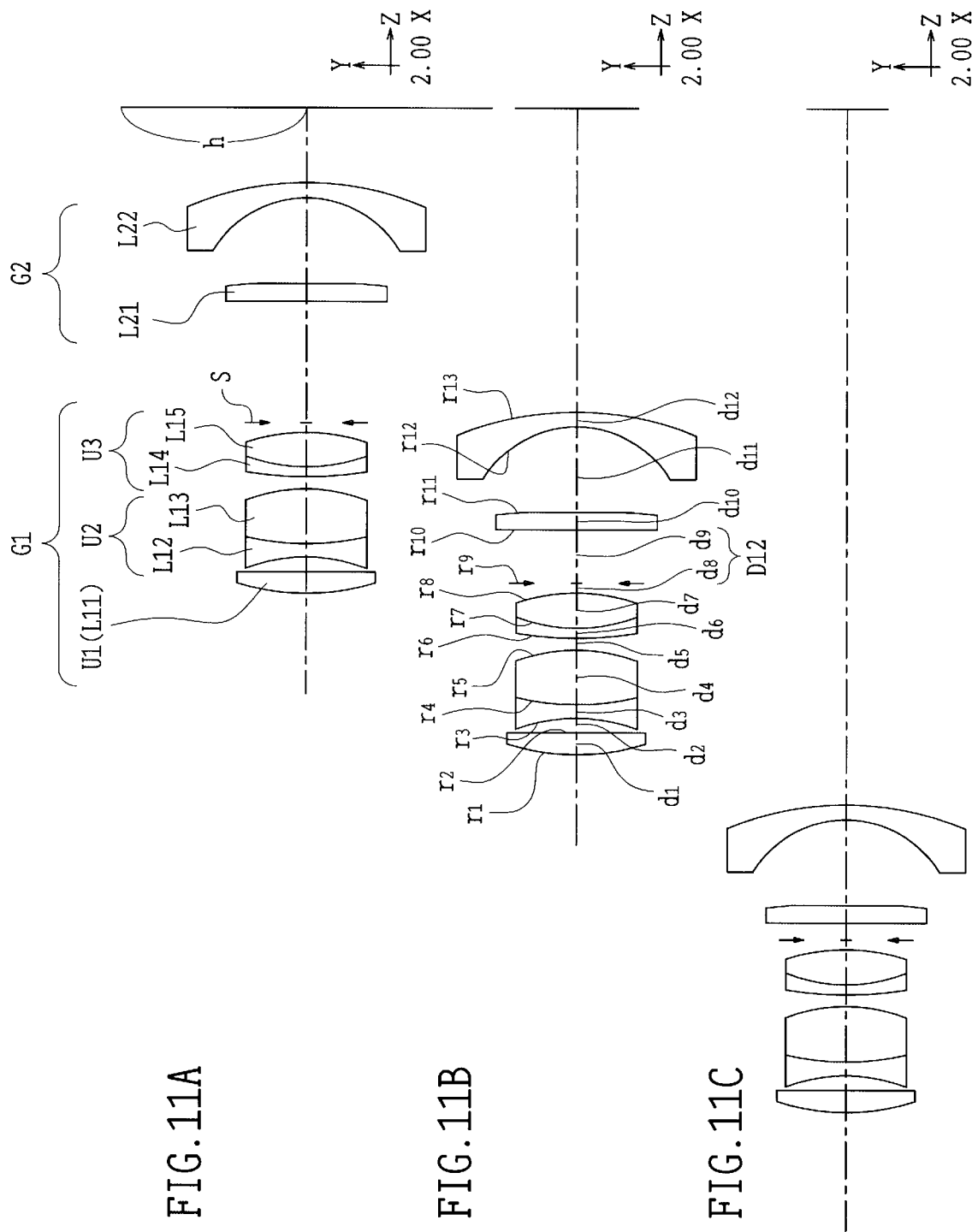

SPHERICAL ABERRATION | ASTIGMATISM | DISTORTION
FIG.12A | FIG.12B | FIG.12C
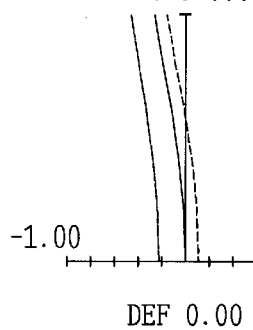
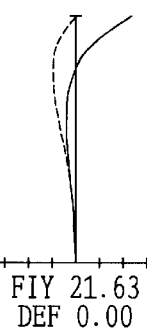
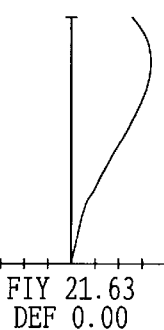
FIG.12D | FIG.12E | FIG.12F
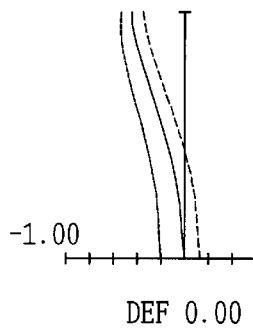
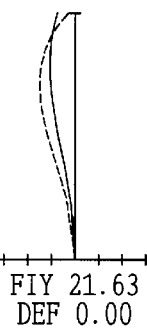
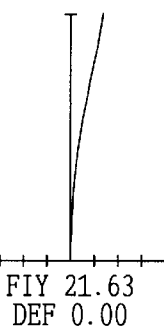
FIG.12G | FIG.12H | FIG.12I
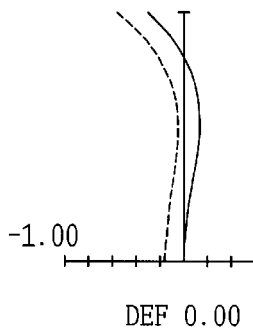
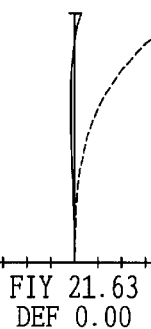
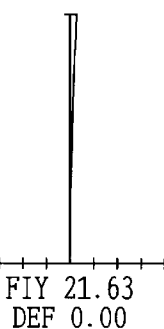
485.13 ———
656.27 - - - - -
587.56 ———

ZOOM OPTICAL SYSTEM AND CAMERA USING THE SAME

BACKGROUND OF THE INVENTION

1) Field of the Invention

The present invention relates to a zoom optical system used for a photographing camera, specifically, for a lens-shutter camera, and to a camera using the same zoom optical system.

2) Description of Related Art

In recent years, lens-shutter cameras provided with a zoom lens have become popular, and requirement for a camera provided with a small-sized photographing lens with highly variable magnification have been raised. Regarding a zoom lens having a variable magnification ratio (ratio of the focal length of the entire system in the telephoto end position to the focal length of the entire system in the wide-angle end position) of 2 or 3, those with a two-unit zoom configuration arranging, in order from the object side, a positive refracting power and a negative refracting power are popularly used. Also, regarding a zoom lens having a variable magnification ratio of 3 or 4.5, those with a three-unit zoom configuration arranging, in order from the object side, a positive refracting power, a positive refracting power and a negative refracting power are popularly used.

A zoom lens with three-unit configuration allows fluctuation of aberrations to be small during zooming between the wide-angle end and the telephoto end. However, the configuration obliges the lens to be larger in size and more complex than a lens with two-unit zoom configuration, with larger number of lens elements and larger size of each lens unit. These features consequently raise the cost.

On the other hand, a zoom lens with two-unit configuration can be constructed of a smaller number of lens elements, to have a more simple structure. Therefore, it facilitates reduction in size and weight of a camera in which it is incorporated, and thus is advantageous in view of cost. For this reason, two-unit zoom configuration is often employed for a zoom lens of a compact camera.

However, the conventional zoom lens with two-unit configuration has a problem in that its small size and highly variable magnification cause large aberrations.

Conventional art to solve this problem is disclosed in Japanese Patent Application Preliminary Publication (KOKAI) No. Hei 11-258503, Japanese Patent Application Preliminary Publication (KOKAI) No. Hei 10-48523, Japanese Patent Application Preliminary Publication No. Hei 8-110468, etc. However, each of JP KOKAI No. Hei 11-258503 and JP KOKAI NO. Hei 8-110468 discloses a system having a variable magnification ratio greater than 3.3, with a telephoto ratio (ratio of the entire length of the entire system in the telephoto end position to the focal length of the entire system in the telephoto end position) greater than 0.9. Regarding the system recited in JP KOKAI NO. 10-48523 also, while the variable magnification ratio is 3, the telephoto ratio is as small as 0.9, which is not small enough to achieve compact sizing. Thus, these conventional systems are not preferable in view of cost or size. Also, such a system requires the lens frame to bear too large load. In addition, since such a zoom lens largely protrudes from the camera body, the center of gravity resides on the front portion of the camera. Accordingly, camera shake via user's hands often occurs.

SUMMARY OF THE INVENTION

In consideration of the problems stated above, an object of the present invention is to provide a compact zoom optical system of two-unit configuration that achieves good imaging performance, with a variable magnification ratio greater than 3 and a telephoto ratio smaller than 0.85, and a camera using the same zoom optical system.

Therefore, in order to achieve the above-mentioned object, a zoom optical system according to the first aspect of the present invention includes a lens system that consists of, in order from the object side, a first lens unit having a positive refracting power and a second lens unit having a negative refracting power. In variable magnification change from the wide-angle end through the telephoto end, each lens unit is moved toward the object side in such a manner that a space between the first lens unit and the second lens unit decreases. The first lens, unit consists of, in order from the object side, a first lens component having a positive refracting power, a second lens component having a negative refracting power, and a third lens component having a positive refracting power, which consists of one cemented-lens component. In addition, the following condition (1) is satisfied:

$$f_T/f_W > 3 \tag{1}$$

where $f_T$ is a focal length of the entire system in the telephoto end position, and $f_W$ is a focal length of the entire system in the wide-angle end position.

Also, a zoom optical system according to the second aspect of the present invention includes a lens system that consists of, in order from the object side, a first lens unit having a positive refracting power and a second lens unit having a negative refracting power. In variable magnification change from the wide-angle end through the telephoto end, each lens unit is moved toward the object side in such a manner that a space between the first lens unit and the second lens unit decreases. The first lens unit consists of, in order from the object side, a first lens component having a positive refracting power, a second lens component having a negative refracting power, and a third lens component having a positive refracting power, which consists of one cemented-lens component. The second lens unit includes at least one positive lens element and two negative lens elements. One of these two negative lens elements is a negative meniscus lens that is disposed on the most image side with a convex surface thereof being directed toward the image side. In addition, the following conditions (2) and (3) are satisfied:

$$L_T/f_T < 0.85 \tag{2}$$

$$1.67 < N_{L23} \tag{3}$$

where $L_T$ is a total length of the entire system in the telephoto end position, $f_T$ is a focal length of the entire system in the telephoto end position, and $N_{L23}$ is a refractive index of the negative lens element disposed on the most image side in the second lens unit.

Also, in each of the first and second aspects, it is preferred that the following condition (4) is further satisfied:

$$1.7 < N_{L23} \tag{4}$$

where $N_{L23}$ is a refractive index of a negative lens element that is disposed on the most image side in the second lens unit.

Also, in each of the first and second aspects, it is preferred that the following conditions (5) and (6) are further satisfied:

$$3.8 < f_T/f_1 < 5.5 \tag{5}$$

$$-7.0 < f_T/f_2 < -5.0 \tag{6}$$

where $f_1$ is a focal length of the first lens unit, and $f_2$ is a focal length of the second lens unit.

Also, in each of the first and second aspects, it is preferred that the following condition (7) is further satisfied:

$$0.02 < D_{12}/f_W < 0.06 \quad (7)$$

where $D_{12}$ is a space between the first lens component and the second lens component, and $f_W$ is a focal length of the entire system in the wide-angle end position.

Also, in each of the first and second aspects, it is preferred that the second lens unit includes a plastic lens element having at least one aspherical surface.

Also, in each of the first and second aspects, it is preferred that the following condition (8) is further satisfied:

$$0.03 < D_{12}/f_W < 0.05 \quad (8)$$

where $D_{12}$ is a space between the first lens component and the second lens component, and $f_W$ is a focal length of the entire system in the wide-angle end position.

Also, in each of the first and second aspects, it is preferred that the following condition (9) is satisfied:

$$N_{1N} > 1.8 \quad (9)$$

where $N_{1N}$ is a refractive index of any negative lens element in the first lens unit.

Also, in each of the first and second aspects, it is preferred that the following condition (10) is satisfied:

$$0.05 < D_{12}/h < 0.1 \quad (10)$$

where $D_{12}$ is a space between the first lens component and the second lens component, and h is a maximum image height on the image surface.

Also, in the first aspect, it is preferred that at least the Condition (2) is satisfied.

Also, a zoom optical system according to the third aspect of the present invention includes a lens system that consists of, in order from the object side, a first lens unit having a positive refracting power and a second lens unit having a negative refracting power. In variable magnification change from the wide-angle end through the telephoto end, each lens unit moves toward the object side in such a manner that a space between the first lens unit and the second lens unit decreases. The first lens unit consists of, in order from the object side, a first lens component having a positive refracting power, a second lens component having a negative refracting power, and a third lens component having a positive refracting power, which includes at least one negative lens element. The second lens unit consists of, in order from the object side, a lens element having a negative refracting power, a lens element having a positive refracting power, and a lens element having a negative refracting power.

Also, a zoom optical system according to the fourth aspect of the present invention includes a lens system that consists of, in order from the object side, a first lens unit having a positive refracting power and a second lens unit having a negative refracting power. In variable magnification change from the wide-angle end through the telephoto end, each lens unit is moved toward the object side in such a manner that a space between the first lens unit and the second lens unit decreases. The first lens unit consists of a first lens component having a positive refracting power, a second lens component having a negative refracting power, and a third lens component having a positive refracting power, which consists of one cemented-lens component. The second lens unit consists of two lens elements each having a negative refractive power. The object-side negative lens element in the second lens unit has at least one aspherical surface.

Also, in each of the third and fourth aspects, it is preferred that the Conditions (5) and (6) are satisfied.

Also, in each of the third and fourth aspects, it is preferred that the Condition (7) is satisfied.

Also, in each of the third and fourth aspects, it is preferred that the Condition (9) is satisfied.

Also, in each of the third and fourth aspects, it is preferred that the Condition (2) is satisfied.

Also, a zoom optical system according to the fifth aspect of the present invention includes a lens system that consists of, in order from the object side, a first lens unit having a positive refracting power and a second lens unit having a negative refracting power. In variable magnification change from the wide-angle end through the telephoto end, each lens unit is moved toward the object side in such a manner that a space between the first lens unit and the second lens unit decreases. The first lens unit consists of, in order from the object side, a lens element having a positive refracting power, a lens component consisting of a lens element having a negative refracting power and a lens element having a positive refracting power cemented together, and a lens component consisting of a lens element having a negative refracting power and a lens element having a positive refracting power cemented together. The second lens unit includes at least two negative lens elements and has at least one aspherical surface.

Also, in the fifth aspect, it is preferred that the Conditions (5) and (6) are satisfied.

Also, in the fifth aspect, it is preferred that the first lens unit consists of, in order from the object side, a first lens component having a positive refracting power and consisting of a lens element, a second lens component having a negative refracting power and consisting of a cemented lens, and a third lens component having a positive refracting power and consisting of a cemented lens, and that the Condition (7) is satisfied.

Also, in the fifth aspect, it is preferred that the second lens unit includes a plastic lens element having at least one aspherical surface.

Also, in the fifth aspect, it is preferred that the Condition (9) is satisfied.

Also, in the fifth aspect, it is preferred that the Condition (2) is satisfied.

Also, a zoom optical system according to the sixth aspect of the present invention includes a lens system consists of, in order from the object side, a first lens unit having a positive refracting power and a second lens unit having a negative refracting power. In variable magnification change from the wide-angle end through the telephoto end, each lens unit is moved toward the object side in such a manner that a space between the first lens unit and the second lens unit decreases. The first lens unit includes a single-lens component arranged on the most object side and consisting of a positive lens element with an object-side surface thereof being convex toward the object side, and at least two cemented-lens components each consisting of a positive lens element and a negative lens element cemented together. In addition, the following condition is satisfied:

$$f_T/f_W > 2.7 \quad (11)$$

where $f_T$ is a focal length of the entire system in the telephoto end position and $f_W$ is a focal length of the entire system in the wide-angle end position.

Also, in the sixth aspect, it is preferred that the Conditions (5) and (6) are satisfied.

Also, in the sixth aspect, it is preferred that the first lens unit consists of, in order from the object side, a first lens component having a positive refractive power and consisting of a lens element, a second lens component having a negative refracting power and consisting of a cemented-lens component, and a third lens component having a positive refractive power and consisting of a cemented-lens component, and that the Condition (10) is satisfied.

Also, in the sixth aspect, it is preferred that the second lens unit includes a plastic lens element having at least one aspherical surface.

Also, in the sixth aspect, it is preferred that the Condition (9) is satisfied.

Also, in the sixth aspect, it is preferred that the Condition (2) is satisfied.

Also, it is preferred that a camera for photographing using a film according to the present invention includes a zoom optical system of any one of the first to sixth aspects, and a frame, which limits the photographing field, arranged on the image side of the optical system.

Also, it is preferred that a camera for photographing using an electronic image according to the present invention includes a zoom optical system of any one of the first to sixth aspects, and an electronic image pickup device, which limits the photographing field, arranged on the image side of the optical system.

This and other objects as well as features and advantages of the present invention will become apparent from the following detailed description of the preferred embodiments when taken in conjunction with the accompanying drawings.

BRIEF DESCRIPTION OF THE DRAWINGS

FIG. 1A shows the condition in the wide-angle end position, FIG. 1B shows the condition in the intermediate position, and FIG. 1C shows the condition in the telephoto end position.

FIGS. 2A, 2B, and 2C show spherical aberration, astigmatism, and distortion, respectively, in the wide-angle end position. FIGS. 2D, 2E, and 2F show spherical aberration, astigmatism, and distortion, respectively, in the intermediate position. FIGS. 2G, 2H, and 2I show spherical aberration, astigmatism, and distortion, respectively, in the telephoto end position.

FIGS. 3A–3C are sectional views of a lens configuration of a zoom optical system according to the second embodiment of the present invention, taken along the optical axis. FIG. 3A shows the condition in the wide-angle end position, FIG. 3B shows the condition in the intermediate position, and FIG. 3C shows the condition in the telephoto end position.

FIGS. 4A, 4B, and 4C show spherical aberration, astigmatism, and distortion, respectively, in the wide-angle end position. FIGS. 4D, 4E, and 4F show spherical aberration, astigmatism, and distortion, respectively, in the intermediate position. FIGS. 4G, 4H, and 4I show spherical aberration, astigmatism, and distortion, respectively, in the telephoto end position.

FIG. 5A shows the condition in the wide-angle end position, FIG. 5B shows the condition in the intermediate position, and FIG. 5C shows the condition in the telephoto end position.

FIGS. 6A, 6B, and 6C show spherical aberration, astigmatism, and distortion, respectively, in the wide-angle end position. FIGS. 6D, 6E, and 6F show spherical aberration, astigmatism, and distortion, respectively, in the intermediate position. FIGS. 6G, 6H, and 6I show spherical aberration, astigmatism, and distortion, respectively, in the telephoto end position.

FIGS. 7A–7C are sectional views of a lens configuration of a zoom optical system according to the fourth embodiment of the present invention, taken along the optical axis. FIG. 7A shows the condition in the wide-angle end position, FIG. 7B shows the condition in the intermediate position, and FIG. 7C shows the condition in the telephoto end position.

FIGS. 8A–8I are aberration diagrams of the fourth embodiment. FIGS. 8A, 8B, and 8C show spherical aberration, astigmatism, and distortion, respectively, in the wide-angle end position. FIGS. 8D, 8E, and 8F show spherical aberration, astigmatism, and distortion, respectively, in the intermediate position. FIGS. 8G, 8H, and 8I show spherical aberration, astigmatism, and distortion, respectively, in the telephoto end position.

FIG. 9A shows the condition in the wide-angle end position, FIG. 9B shows the condition in the intermediate position, and FIG. 9C shows the condition in the telephoto end position.

FIGS. 10A, 10B, and 10C show spherical aberration, astigmatism, and distortion, respectively, in the wide-angle end position. FIGS. 10D, 10E, and 10F show spherical aberration, astigmatism, and distortion, respectively, in the intermediate position. FIGS. 10G, 10H, and 10I show spherical aberration, astigmatism, and distortion, respectively, in the telephoto end position.

FIGS. 11A–11C are sectional views of a lens configuration of a zoom optical system according to the sixth embodiment of the present invention, taken along the optical axis. FIG. 11A shows the condition in the wide-angle end position, FIG. 11B shows the condition in the intermediate position, and FIG. 11C shows the condition in the telephoto end position.

FIGS. 12A–12I are aberration diagrams of the sixth embodiment. FIGS. 12A, 12B, and 12C show spherical aberration, astigmatism, and distortion, respectively, in the wide-angle end position. FIGS. 12D, 12E, and 12F show spherical aberration, astigmatism, and distortion, respectively, in the intermediate position. FIGS. 12G, 12H, and 12I show spherical aberration, astigmatism, and distortion, respectively, in the telephoto end position.

DETAILED DESCRIPTION OF THE PREFERRED EMBODIMENTS

Figures 1A, 1B, 1C:
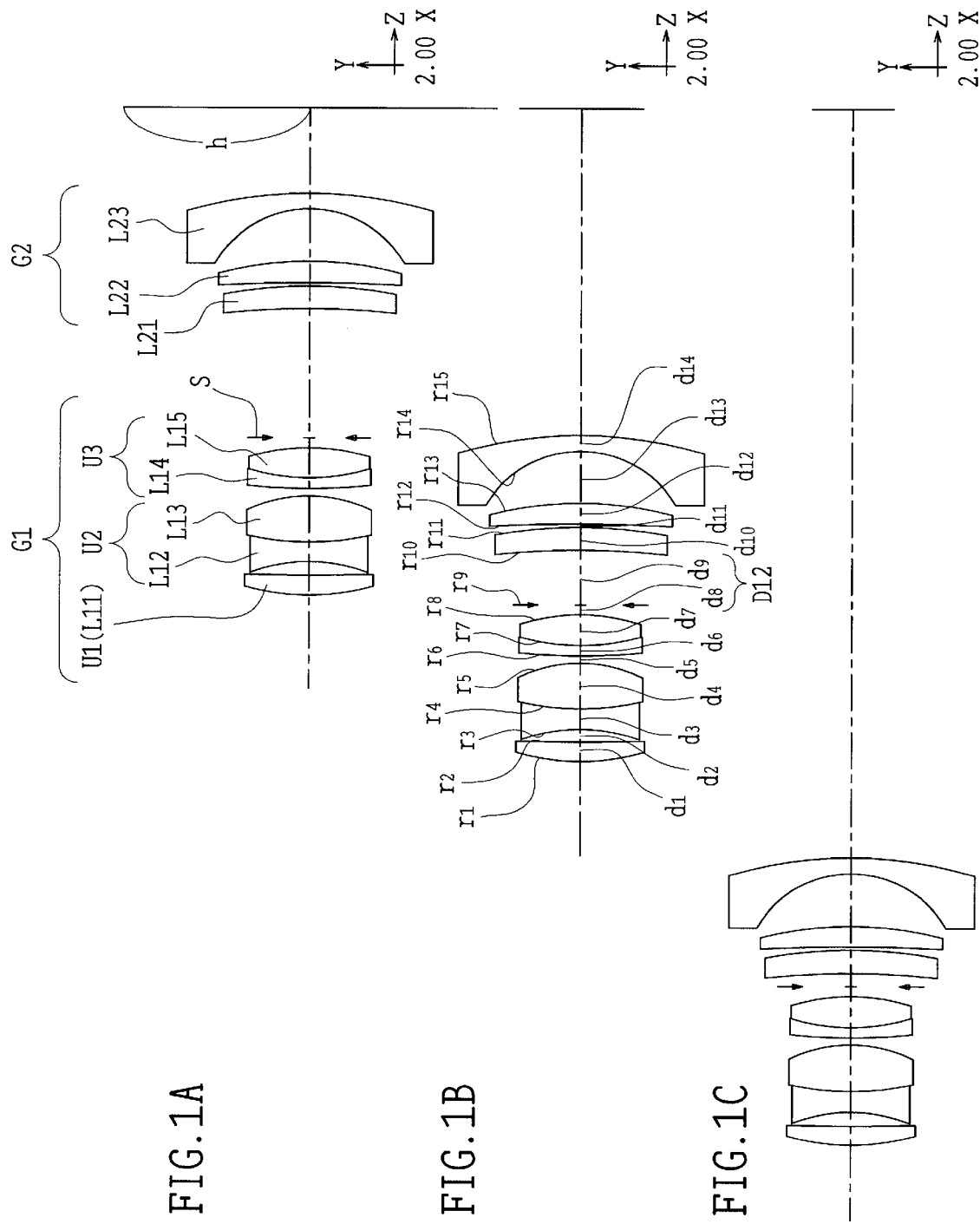
FIGS. 1A–1C are sectional views of a lens configuration of a zoom optical system according to the first embodiment of the present invention, taken along the optical axis.
Figure 2A:
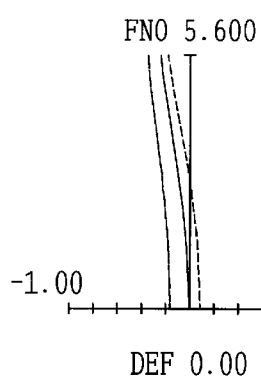
FIGS. 2A–2I are aberration diagrams of the first embodiment.
Figure 2B:
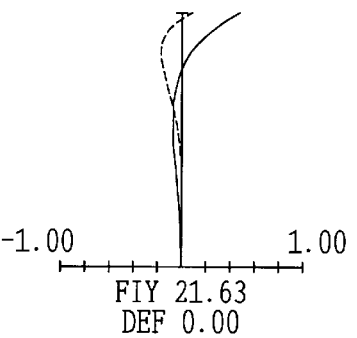
Figure 2C:
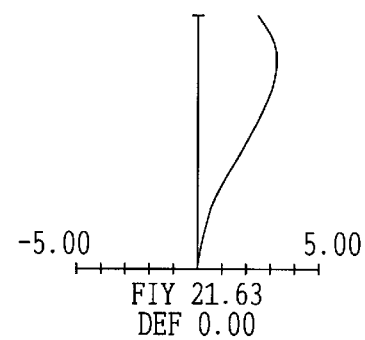
Figure 2D:
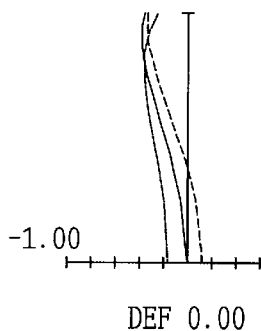
Figure 2E:
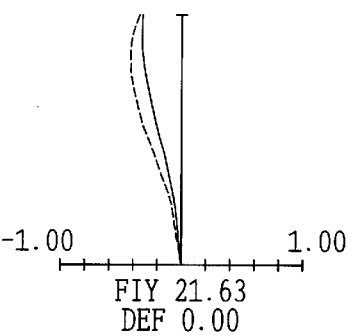
Figure 2F:
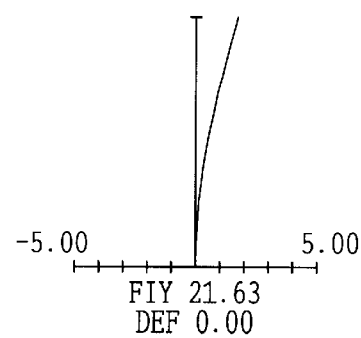
Figure 2G:
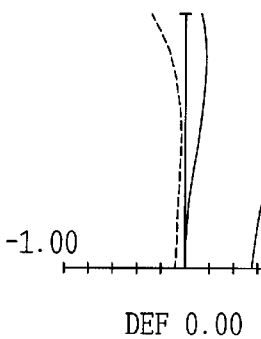
Figure 2H:
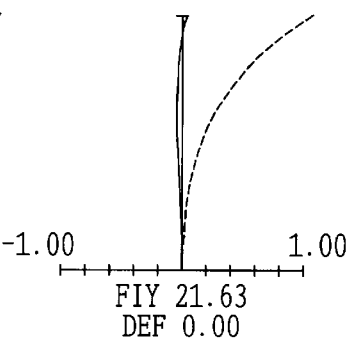
Figure 2I:
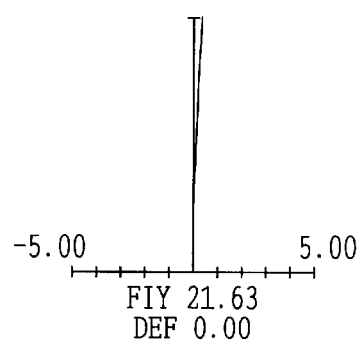
Figure 4A:
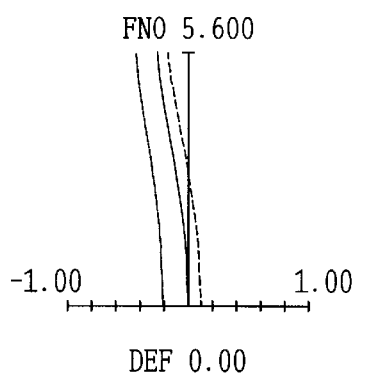
FIGS. 4A–4I are aberration diagrams of the second embodiment.
Figure 4B:
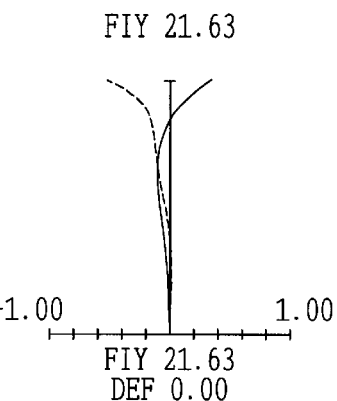
Figure 4C:
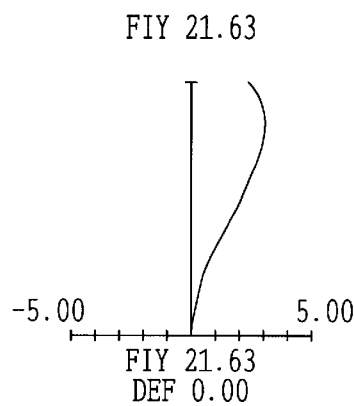
Figure 4D:
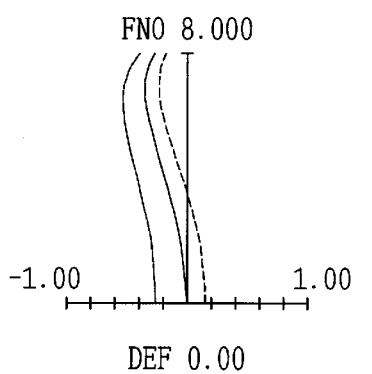
Figure 4E:
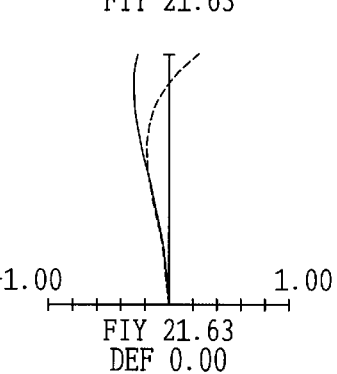
Figure 4F:
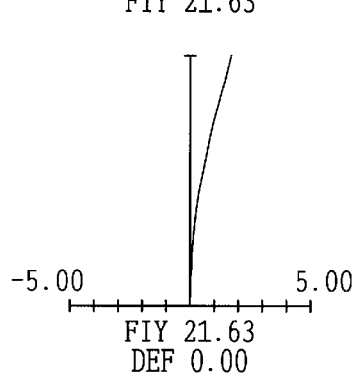
Figure 4G:
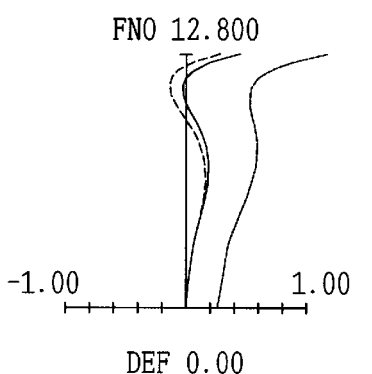
Figure 4H:
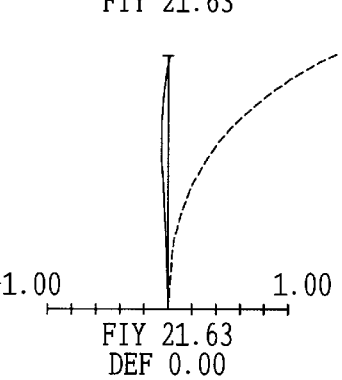
Figure 4I:
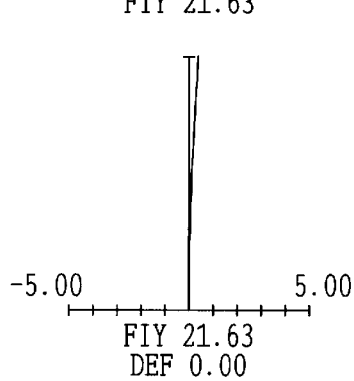

Modes for carrying out the present invention are explained below. First, preceding description of individual embodiments, the basic conception and function of the present invention are explained.

The present invention is applied to a simple zoom optical system of two-unit type zooming, which consists of, in order from the object side, a first lens unit having a positive refracting power and a second lens unit having a negative refracting power, wherein, in variable magnification change from the wide-angle end through the telephoto end, each lens unit is moved toward the object side in such a manner that the space between the first lens unit and the second lens unit decreases.

In a two-unit zoom lens having a positive-negative power arrangement, since the imaging performance of the positive first lens unit is magnified by the negative second lens unit as being compensated for, a lens configuration that could reduce generation of aberrations in each lens unit, specifically in the first lens unit, is desirable.

Therefore, according to the basic configuration of the present invention, the first lens unit is configured as a triplet-type lens unit that consists of three lens components having positive-negative-positive refracting powers, which can achieve good compensation for aberrations as a single-focus lens.

The above-mentioned basic configuration is a common characteristic of the first to sixth aspects described in detail below.

According to the first aspect of the present invention, the third lens component of the first lens unit consists of a cemented lens.

In order to shorten the entire system length in the case of the two-unit zoom configuration, a power of each lens unit should be enhanced, to shorten the length of each lens unit. In view of performance, a large number of lenses would allow aberrations to be well compensated for because the power is distributed among these lenses. However, in view of compact-sizing of the entire length of each lens unit, a large number of lenses is not preferable. On the other hand, since a large power causes a large amount of aberrations to be generated in the entire lens unit, it is necessary to enhance compensation effect in each lens component. The third lens component, which is adjacent to the stop, mainly contributes to compensation for spherical aberration and coma. If the third lens component is configured to use positive-negative lens elements, high compensation effect is obtained, while higher-order aberrations increase. Therefore, the third lens component is constructed of a cemented lens, so that generation of higher order aberrations is kept small while high aberration-compensating effect is obtained.

According to the first aspect, in addition, the Condition (1) set forth above, which is a basic condition for a highly variable zoom optical system and which limits the ratio of the focal length in the telephoto end position to the focal length in the wide-angle end position (variable magnification ratio), is satisfied. Whereby, the variable range of the field angle for photographing becomes wide and accordingly facilitates photographing with various field angles suitable for various situations. In this way, usability of a camera using this zoom optical system is improved.

If the value of $f_T/f_W$ falls below the lower limit of the Condition (1), though compensation for aberrations can be easily made over the entire zoom range, magnification is not so highly variable as to achieve a designed variable magnification ratio. Also, since compensation for aberrations could be easily made even if the first lens unit is not configured as a triplet-type lens unit consisting of three lens components, the lens elements are regarded even over-numbered, which is not preferable in view of cost and size.

Also, it is much preferred that the value of $f_T/f_W$ does not exceed 3.2.

If the value of $f_{T/W}$ exceeds 3.2, it is difficult to perform compensation for aberrations with a small number of lenses.

According to the second aspect of the present invention, the third lens component of the first lens unit consists of a cemented lens.

In order to shorten the entire system length in the case of the two-unit zoom configuration, a power of each lens unit should be enhanced, to shorten the length of each lens unit. In view of performance, a large number of lenses would allow aberrations to be well compensated for because the power is distributed among these lenses. However, in view of compact-sizing of the entire length of each lens unit, a large number of lenses is not preferable. On the other hand, since a large power causes a large amount of aberrations to be generated in the entire lens unit, it is necessary to enhance compensation effect in each lens component. The third lens component, which is adjacent to the stop, mainly contributes to compensation for spherical aberration and coma. If the third lens component is configured to use positive-negative lens elements, high compensation effect is obtained, while higher-order aberrations increase. Therefore, the third lens component is constructed of a cemented lens, so that generation of higher order aberrations is kept small while high aberration-compensating effect is obtained.

Also, according to the second aspect, the second lens unit includes at least a positive lens element and two negative lens elements. Whereby, the negative power is distributed between these two lens elements, to moderate the curvature of the lenses, for example, so that generation of aberrations and fluctuation of aberrations in magnification change are reduced.

Also, according to the second aspect, the Condition (2) set forth above is satisfied. The Condition (2) relates to the ratio of the entire length of the entire system in the telephoto-end position to the focal length in the telephoto end position (telephoto ratio), and thus is a condition to be satisfied for compact-sizing.

If the value of $L_T/f_T$ satisfies the Condition (2), even a long focal length on the telephoto side allows the total lens length to be short. Accordingly, the lens frame, which drives the first lens unit, is particularly relieved from too large load in drive operation and the electric power for driving the lenses can be kept low.

If the value of $L_T/f_T$ exceeds the upper limit of the Condition (2), the telephoto ratio becomes different from the designed value. In this case, the power of each lens unit is allowed to be weak and compensation for aberrations could be easily made even if lenses are not configured in accordance with the basic configuration described above. Therefore, if the first lens unit is formed in accordance with the basic configuration, the lens elements are regarded even over-numbered and thus prevents compact-sizing, which is not preferable in view of cost and size. Also, in addition to the overload on the lens frame, since the zoom lens largely protrudes from the camera body, the center of gravity resides on the front portion of the camera. Accordingly, camera shake via user's hands often occurs.

Also, regarding the Condition (2), it is much desirable that the value of $L_T/f_T$ does not fall below 0.75. If the value of $L_T/f_T$ is lower than 0.75, it is difficult to perform good compensation for aberrations with a small number of lenses. In addition, since many of the lenses have thin circumferential faces, to lower productivity and prevent mass-production, it is not preferable in view of cost. It is noted that in the remaining aspects of the present invention also, it is desirable that the Condition (2) is satisfied.

Also, according to the second aspect, the Condition (3) set forth above is further satisfied. The Condition (3) limits the refractive index of the negative lens disposed on the most image side in the second lens unit.

If the second lens unit, which is disposed adjacent to the image surface in a two-unit zoom configuration, is constructed of three or more lenses, the outer diameter of the hindmost lens becomes large, to prevent compact-sizing.

If the value of $N_{L23}$ falls below the lower limit of the Condition (3), a short back focus would render the outer diameter large, to prevent compact-sizing. Furthermore, since the refractive index is low, the radius of curvature of the object-side surface of the hindmost lens becomes small. Accordingly, it is difficult to reduce generation of spherical aberration in the telephoto end position. Regarding the value of $N_{L23}$, if the range is further limited by the Condition (4) in place of Condition (3), further compact-sizing can be achieved. Significance of the Condition (4) is similar to the Condition (3).

Also, regarding the Conditions (3) and (4), it is much desirable that the value of $N_{L23}$ does not exceed 1.75. If the value of $N_{L23}$ is greater than 1.75, the cost for aberration compensation becomes high. The lower limit of $N_{L23}$ may be set to be 1.725. In the first aspect described above also, it is desirable to satisfy on the Condition (4).

According to the third aspect of the present invention, a negative lens element is arranged in the third lens component of the first lens unit.

In order to shorten the entire system length in the case of the two-unit zoom configuration, a power of each lens unit should be enhanced, to shorten the length of each lens unit. In view of performance, a large number of lenses would allow aberrations to be well compensated for because the power is distributed among these lenses. However, in view of compact-sizing of the entire length of each lens unit, a large number of lenses is not preferable. On the other hand, since a large power causes a large amount of aberrations to be generated in the entire lens unit, it is necessary to enhance compensation effect in each lens component.

Therefore, the third lens component having a positive refracting power, which greatly contributes to compensation for spherical aberration and coma in the first lens unit, is provided with a negative lens so that positive-negative lens combination having a positive power causes the spherical aberration and coma to cancel out, to achieve good compensation for aberrations.

Also, according to the third aspect, the second lens unit is configured to include three lenses. The negative power is distributed between two lenses, to moderate curvatures of the lenses, for example, so that generation of aberrations and fluctuation of aberrations in magnification change are reduced. In this case, the configuration where a negative lens, a positive lens, and a negative lens are arranged in this order in the second lens unit reduces the effect on fluctuation of the focal length caused by fluctuation of a space inside the second lens unit. In the conventional and general configuration where a positive lens and a negative lens are arranged in this order or where a positive lens, a negative lens, and a negative lens are arranged in this order, each of the positive lens and the first negative lens has a substantial power and substantial meniscus shape. Therefore, fluctuation of the air space between them and decentering of lenses disposed on both sides of these positive and negative lenses greatly affect the image surface. In contrast, in the configuration of the third aspect where the negative lens, a positive lens, and a negative lens are arranged in this order, the first negative lens and the positive lens need not to have large powers or distinct meniscus shape. Accordingly, decentering of these negative lens and positive lens would little affect performance. Therefore, while a large power is given to the second lens unit for compact-sizing, productivity is good.

According to the fourth aspect of the present invention, the third lens component of the first lens unit consists of a cemented lens.

In order to shorten the entire system length in the case of the two-unit zoom configuration, a power of each lens unit should be enhanced, to shorten the length of each lens unit. In view of performance, a large number of lenses would allow aberrations to be well compensated for because the power is distributed among these lenses. However, in view of compact-sizing of the entire length of each lens unit, a large number of lenses is not preferable. On the other hand, since a large power causes a large amount of aberrations to be generated in the entire lens unit, it is necessary to enhance compensation effect in each lens component. The third lens component of the first lens unit, which is adjacent to the stop, mainly contributes to compensation for spherical aberration and coma. If the third lens component is configured to use positive-negative lens elements, high compensation effect is obtained, while higher-order aberrations increase. Therefore, the third lens component is constructed of a cemented lens, so that generation of higher-order aberrations is kept small while high aberration-compensating effect is obtained.

Also, according to the fourth aspect, the second lens unit consists of negative lenses.

If compact-sizing is designed on the basis of the two-unit zoom configuration, Petzval sum tends to be negative in the telephoto end position and meridional astigmatism becomes large in the positive direction. Therefore, a positive lens is excluded from the second lens unit so that Petzval sum becomes small and the image surface is kept in good condition.

Also, according to the fourth aspect, an aspherical surface is provided for a negative lens of the second lens unit. This is because appropriate compensation for aberrations could not be made in the configuration where a positive lens is merely removed. Application of an aspherical surface allows aberrations to be appropriately compensated for in the second lens unit also.

According to the fifth aspect of the present invention, the first lens unit having a positive-negative-positive lens configuration specifically consists of a lens component L11 having a positive refractive power, a lens component having a negative refractive power and consisting of a negative lens element L12 and a positive lens element L13 cemented together, and a lens component having a positive refracting power and consisting of a negative lens element and a positive lens element cemented together.

In order to shorten the entire system length in the case of the two-unit zoom configuration, a power of each lens unit should be enhanced, to shorten the length of each lens unit. In view of performance, a large number of lenses would allow aberrations to be well compensated for because the power is distributed among these lenses. However, in view of compact-sizing of the entire length of each lens unit, a large number of lenses is not preferable. On the other hand, if the power is made strong, individual lenses constituting a lens unit should have strong powers, and accordingly the radius of curvature of each lens becomes small, to generate large aberrations. As a radius of curvature decreases, generation of higher-order aberrations caused by an air lens increases. Excessive generation of higher-order aberrations degrades the aberration condition on the periphery of the view surface.

Therefore, according to the fifth aspect, configuration is made to include cemented lenses for appropriate compensation for aberrations. In this configuration, a higher effect of reducing generation of higher-order aberrations is obtained than in the case where an air space exists. Specifically, bonding the lenses L12 and L13 together contributes to compensation for axial chromatic aberrations, and bonding the lenses L14 and L15 together contributes to good compensation for spherical aberration and coma.

Also, according to the fifth aspect, the second lens unit includes at least two negative lenses and has at least one aspherical surface.

According to the sixth aspect of the present invention, the most object-side lens surface in the first lens unit is made convex toward the object side, so that an incident angle of an off-axial ray is less inclined on the first lens unit, where the height of off-axial rays is high, to reduce generation of aberrations.

Also, according to the sixth aspect, the first lens unit includes at least two cemented-lens components each having a positive lens element and a negative lens element cemented together.

In order to shorten the entire system length in the case of the two-unit zoom configuration, a power of each lens unit should be enhanced, to shorten the length of each lens unit. In view of performance, a large number of lenses would allow aberrations to be well compensated for because the power is distributed among these lenses. However, in view of compact-sizing of the entire length of each lens unit, a large number of lenses is not preferable. On the other hand, if the power is made strong, individual lenses constituting a lens unit should have strong powers, and accordingly the radius of curvature of each lens becomes small, to generate large aberrations. As a radius of curvature decreases, generation of higher-order aberrations caused by an air lens increases. Excessive generation of higher-order aberrations degrades the aberration condition on the periphery of the view surface.

Therefore, configuration is made to include cemented lenses for appropriate compensation for aberrations. In this configuration, a higher effect of reducing generation of higher-order aberrations is obtained than in the case where an air space exists. In addition, bonding a positive lens and a negative lens together contributes to good compensation for axial chromatic aberrations also.

Also, according to the sixth aspect, the Condition (11) is satisfied. Significance of the Condition (11) is similar to the Condition (1).

According to the present invention, it is desirable that the Conditions (5) and (6) are satisfied.

The Condition (5) limits the ratio of the focal length of the entire system in the telephoto end to the focal length of the first lens unit.

If the value of $f_T/f_1$ exceeds the upper limit of the Condition (5), it is advantageous for compact-sizing, but does not allow good compensation for aberrations generated in the first lens unit. If the value of $f_T/f_1$ falls below the lower limit of the Condition (5), while the system achieves good performance, compact-sizing fails, because the amount of movement of the second lens unit becomes large and accordingly the entire system length becomes large.

The Condition (6) limits the ratio of the focal length of the entire system in the telephoto end to the focal length of the second lens unit.

If the value of $f_T/f_2$ exceeds the upper limit of the Condition (6), while the system achieves good performance, compact-sizing fails, because the amount of movement of the first lens unit becomes large and accordingly the entire system length becomes large. If the value of $f_T/f_2$ falls below the lower limit of the Condition (6), it is advantageous for compact-sizing, but does not allow good compensation for aberrations generated in the second lens unit.

Regarding the Condition (5), for the purpose of keeping high performance, it is preferred that the lower limit value of $f_T/f_1$ is modified to be 4.37 or further to be 4.6. Simultaneously, regarding the Condition (6), for the purpose of keeping high performance, it is preferred that the upper limit value of $f_T/f_2$ is modified to be −5.53 or further to be −5.80.

According to the present invention, it is desirable that the Conditions (7), (8) and (10) are satisfied.

The Conditions (7) and (8), and the Condition (10) limit the air space between the first lens component and the second lens component in the first lens unit.

If the values of $D_{12}/f_W$ and $D_{12}/h$ exceed the upper limits of the Conditions (7) and (8) and the Condition (10), respectively, while the power of the first lens unit is strong, the height of off-axial rays incident on the first lens component increases and accordingly the outer diameter of the lens increases. In addition, the entire length of the first lens unit also increases, to obstruct compact-sizing. Also, in this case, although the outer diameter may be designed to be small, the amount of marginal light would be extremely poor in the wide-angle end, which is undesirable.

If the values of $D_{12}/f_W$ and $D_{12}/h$ fall below the lower limits of the Conditions (7) and (8) and the Condition (10), respectively, the amount of movement of the first lens unit increases since the power thereof is weak, to obstruct compact-sizing. Regarding the value of $D_{12}/f_W$, it is desirable that the range is further limited by the Condition (8) in place of Condition (7), for the purpose of achieving much better balance between the performance and compact-sizing.

Regarding the Condition (10), it is much preferred that the lower limit value of $D_{12}/h$ is set to be 0.059. Also, it is much desirable that the upper limit value of $D_{12}/h$ is set to be 0.07.

In a case where a zoom optical system according to the present invention is applied to a photographing camera using a film, the image height h equals half the diagonal length of a frame disposed on the image side of the zoom lens for limiting the photographing field.

In short, a zoom optical system according to the present invention is applicable to a photographing camera using a film. Such a camera includes a zoom optical system that satisfies the Condition (10) in the first, second or sixth aspect, for example, and a frame disposed on the image side of the zoom optical system for limiting the photographing field, wherein the image height h is limited by half the diagonal length of the frame.

Alternatively, in a case where a zoom optical system according to the present invention is applied to a photographing camera using an electronic image, the image height h equals half the diagonal length of the maximum effective image-pickup region of an electronic image pickup device disposed on the image side of the zoom lens for limiting the photographing field.

In short, a zoom optical system according to the present invention is applicable to a photographing camera using an electronic image. Such a camera includes a zoom optical system that satisfies the Condition (10) in the first, second or sixth aspect, for example, and an electronic image pickup device disposed on the image side of the zoom optical system for limiting the photographing field, wherein the image height h is limited by half the diagonal length of the maximum effective image pickup region of the electronic image pickup device.

According to the present invention, it is desirable that the Condition (9) is satisfied.

The Condition (9) limits the refracting index of a negative lens in the first lens unit.

For size reduction in the case of the two-unit zoom configuration, a power of each of the first lens unit and the second lens unit should be enhanced. However, since a large power generates a large amount of aberrations in each lens unit, appropriate compensation is needed in each lens unit. In a case where a small number of lenses constitute a lens unit, compact-sizing is facilitated. However, the power assigned to each lens becomes large, and a large amount of aberrations is generated. In contrast, in a case where a large number of lenses are used, compensation for aberrations is easily made. However, the entire system length becomes large and cost becomes high. Therefore, a negative lens that satisfies the Condition (9) is arranged, to reduce the number of negative lenses while keeping good aberration performance.

If the lower limit is not reached, the power of each negative lens is so strong that Petzval sum on the shorter focus side tends to be negative and the sagittal astigmatism tends to be large in the positive direction, which tendency is not desirable.

In order to achieve much higher optical performance, it is desirable to configure the second lens unit to include at least one aspherical surface. In a two-unit zoom lens, the image height of off-axial rays becomes too high at the second lens unit and resultantly a large amount of off-axial aberrations is generated. Therefore, according to the present invention, the aspherical surface is used to perform good compensation for off-axial aberrations.

Furthermore, by providing a plastic lens in the above-described second lens unit, cost reduction is achieved. Since the image height of off-axial rays is higher at the second lens unit than at the first lens unit, the outer diameter of the second lens unit becomes large. A glass lens with a large outer diameter that even has an aspherical surface is very expensive. In contrast, use of plastic is less costly than a glass lens, and allows an aspherical lens to be easily molded. In addition, the specific gravity also is smaller, to contribute to reduction in weight of the product.

First Embodiment

In reference to FIGS. 1A–1C and the numerical data 1 below, a zoom optical system according to the first embodiment of the present invention is described. The zoom optical system of the first embodiment is configured to correspond to the first, second, third, fifth and sixth aspects. Aberration diagrams are shown in FIGS. 2A–2I.

As shown in FIG. 1A, the first lens unit G1 consists of, in order from the object side, a first lens component U1 having a a positive refracting power, a second lens component U2 having a negative refracting power, and a third lens component U3 having a positive refracting power. The first lens component U1 consists of a positive lens element L11, the object-side surface thereof being convex toward the object side. The second lens component U2 consists of a cemented-lens component having a negative lens element L12 and a positive lens element L13. The third lens component consists of a cemented-lens component having a negative lens element L14 and a positive lens element L15.

The second lens unit G2 consists of, in order from the object side, a negative lens element L21, a positive lens element L22, and a negative lens element L23. The negative lens element L23 is constructed of a meniscus lens directing the convex surface thereof toward the image side.

As shown in FIGS. 1A–1C, in variable magnification change from the wide-angle end through the telephoto end, the first lens unit G1 and the second lens unit G2 are configured to move toward the object side in such a manner that the space between them decreases.

Also, an aperture stop S is disposed on the image-surface side of the first lens unit G1. In variable magnification change, the aperture stop S is integrally moved with the first lens unit G1.

Also, the negative lens element L21 has an aspherical surface on the image side.

Numerical data of optical members constituting the zoom optical system according to this embodiment is shown below. In the numerical data of this embodiment, $r_1, r_2, \ldots$ is a radius of curvature of each lens surface, $d_1, d_2, \ldots$ is a thickness of or an air space between each lens, $n_{d1}, n_{d2}, \ldots$ is a refractive index of each lens for d-line rays, and vd1, vd2, ... is Abbe's number of each lens.

It is noted that the shape of an aspherical surface is expressed by the following equation:

$$z = (y^2/r)/[1 + \{1 - (1+K)(y/r)^2\}^{1/2}] + A_4 y^4 + A_6 y^6 + A_8 y^8 + A_{10} y^{10} + A_{12} y^{12}$$

where z is taken along the direction of the optical axis, y is taken along a direction perpendicular to the optical axis, K represents a conical coefficient, and $A_4, A_6, A_8, A_{10},$ and $A_{12}$ represent aspherical coefficients.

These symbols are commonly used in the numerical data of the later-described embodiments also.

Numerical data 1

$r_1 = 19.3110$
  $d_1 = 2.0500$   $n_{d1} = 1.63930$   $v_{d1} = 44.87$
$r_2 = 108.4682$
  $d_2 = 1.3427$
$r_3 = -16.7203$
  $d_3 = 1.9949$   $n_{d3} = 1.83400$   $v_{d3} = 37.16$
$r_4 = 24.0456$
  $d_4 = 4.6334$   $n_{d4} = 1.48749$   $v_{d4} = 70.23$
$r_5 = -14.8916$
  $d_5 = 0.6751$
$r_6 = 42.7697$
  $d_6 = 1.1000$   $n_{d6} = 1.83400$   $v_{d6} = 37.16$
$r_7 = 18.3712$
  $d_7 = 3.0500$   $n_{d7} = 1.59551$   $v_{d7} = 39.24$
$r_8 = -22.8087$
  $d_8 = 1.0000$
$r_9 = \infty$ (stop)
  $d_9 = D9$
$r_{10} = -112.6192$
  $d_{10} = 2.2000$   $n_{d10} = 1.52542$   $v_{d10} = 55.78$
$r_{11} = -1992.6160$ (aspherical)
  $d_{11} = 0.3500$
$r_{12} = -399.7842$
  $d_{12} = 2.0000$   $n_{d12} = 1.63980$   $v_{d12} = 34.46$
$r_{13} = -43.1727$
  $d_{13} = 5.1239$
$r_{14} = -10.7800$
  $d_{14} = 1.5083$   $n_{d14} = 1.77250$   $v_{d14} = 49.60$
$r_{15} = -49.8745$ -continued Numerical data 1

Aspherical coefficients

11th surface

K = 0
$A_4 = -6.4214 \times 10^{-5}$    $A_6 = -4.3211 \times 10^{-7}$
$A_8 = -8.0392 \times 10^{-10}$    $A_{10} = -2.8158 \times 10^{-11}$ zoom data

|  | wide-angle end | intermediate | telephoto end |
| --- | --- | --- | --- |
| focal length | 39.3 | 69.8 | 124.06 |
| FNO. | 5.6 | 8.0 | 12.8 |
| D9 | 12.72 | 5.68 | 1.7 |

Second Embodiment

In reference to FIGS. 3A–3C and the numerical data 2 below, a zoom optical system according to the second embodiment of the present invention is described. The zoom optical system of the second embodiment is configured to correspond to the first, second, third, fifth and sixth aspects. Aberration diagrams are shown in FIGS. 4A–4I.

As shown in FIG. 3A, the first lens unit G1 consists of, in order from the object side, a first lens component U1 having a positive refracting power, a second lens component U2 having a negative refracting power, and a third lens component U3 having a positive refracting power. The first lens component U1 consists of a positive lens element L11, the object-side surface thereof being convex toward the object side. The second lens component U2 consists of a cemented-lens component having a negative lens element L12 and a positive lens element L13. The third lens component U3 consists of a cemented-lens component having a negative lens element L14 and a positive lens element L15.

The second lens unit G2 consists of, in order from the object side, a negative lens element L21, a positive lens element L22, and a negative lens element L23. The negative lens element L23 is constructed of a meniscus lens directing the convex surface thereof toward the image side.

As shown in FIGS. 3A–3C, in variable magnification change from the wide-angle end through the telephoto end, the first lens unit G1 and the second lens unit G2 are configured to move toward the object side in such a manner that the space between them decreases.

Also, an aperture stop S is disposed on the image-surface side of the first lens unit G1. In variable magnification change, the aperture stop S is integrally moved with the first lens unit G1.

Also, the negative lens element L21 has aspherical surfaces on both sides.

Numerical data of optical members constituting the zoom optical system according to this embodiment is shown below.

Numerical Data 2

$r_1 = 18.4636$
    $d_1 = 2.0867$    $n_{d1} = 1.65100$    $v_{d1} = 56.16$
$r_2 = 67.6527$
    $d_2 = 1.4926$

-continued

Numerical Data 2

$r_3 = -17.5956$
    $d_3 = 2.1224$    $n_{d3} = 1.83481$    $v_{d3} = 42.72$
$r_4 = 15.0282$
    $d_4 = 3.5931$    $n_{d4} = 1.48749$    $v_{d4} = 70.23$
$r_5 = -17.2065$
    $d_5 = 1.1723$
$r_6 = 30.3666$
    $d_6 = 1.2995$    $n_{d6} = 1.80400$    $v_{d6} = 46.57$
$r_7 = 16.8734$
    $d_7 = 3.5915$    $n_{d7} = 1.54814$    $v_{d7} = 45.79$
$r_8 = -16.1815$
    $d_8 = 1.0000$
$r_9 = \infty$ (stop)
    $d_9 = D9$
$r_{10} = -177.7449$ (aspherical)
    $d_{10} = 2.5999$    $n_{d10} = 1.52542$    $v_{d10} = 55.78$
$r_{11} = 203.1547$ (aspherical)
    $d_{11} = 0.3492$
$r_{12} = 48.5000$
    $d_{12} = 1.9752$    $n_{d12} = 1.59270$    $v_{d12} = 35.31$
$r_{13} = 284.6343$
    $d_{13} = 4.9357$
$r_{14} = -10.6981$
    $d_{14} = 1.7867$    $n_{d14} = 1.73400$    $v_{d14} = 51.47$
$r_{15} = -58.6583$ Aspherical coefficients 10th surface K = 0
$A_4 = 7.101 \times 10^{-5}$    $A_6 = -1.6049 \times 10^{-7}$
$A_8 = 2.6141 \times 10^{-8}$    $A_{10} = -6.7347 \times 10^{-10}$
$A_{12} = 4.2686 \times 10^{-12}$ 11th surface K = 0
$A_4 = 1.6346 \times 10^{-5}$    $A_6 = -7.1488 \times 10^{-7}$
$A_8 = 1.4268 \times 10^{-8}$    $A_{10} = -1.9005 \times 10^{-10}$ Zoom data

|  | wide-angle end | intermediate | telephoto end |
| --- | --- | --- | --- |
| focal length | 39.3 | 69.3 | 122.25 |
| FNO. | 5.6 | 8.0 | 12.8 |
| D9 | 11.7 | 5.37 | 1.78 |

Third Embodiment

In reference to FIGS. 5A–5C and the numerical data 3 below, a zoom optical system according to the third embodiment of the present invention is described. The zoom optical system of the third embodiment is configured to correspond to the first, second and sixth aspects. Aberration diagrams are shown in FIGS. 6A–6I.

Figures 5A, 5B, 5C:
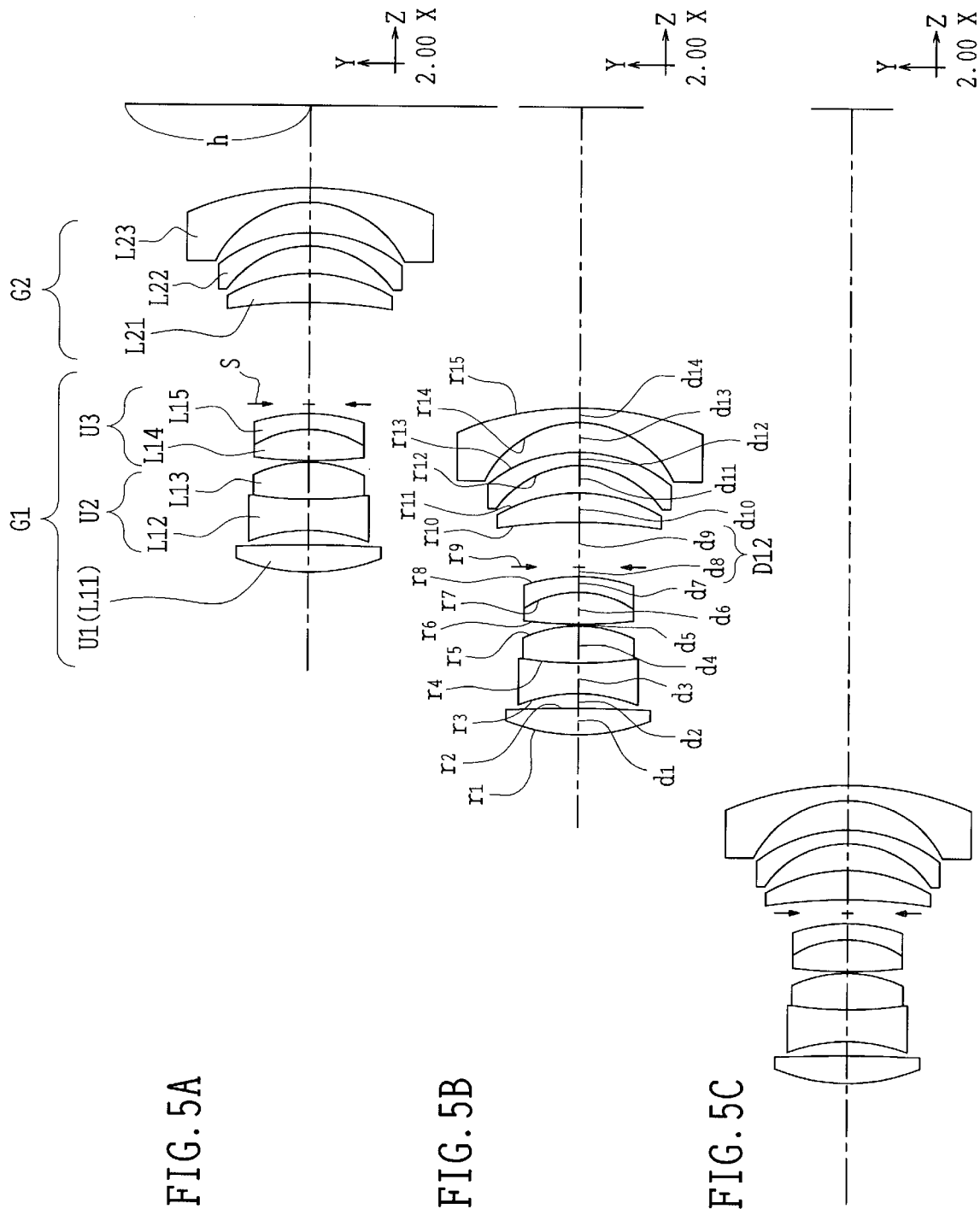
FIGS. 5A–5C are sectional views of a lens configuration of a zoom optical system according to the third embodiment of the present invention, taken along the optical axis.
Figure 6A:
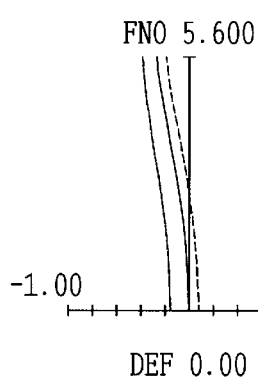
FIGS. 6A–6I are aberration diagrams of the third embodiment.
Figure 6B:
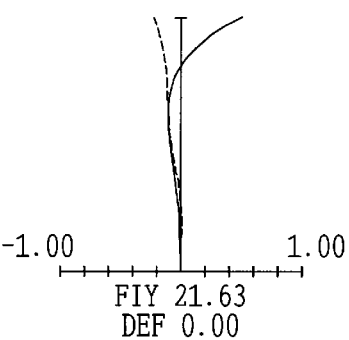
Figure 6C:
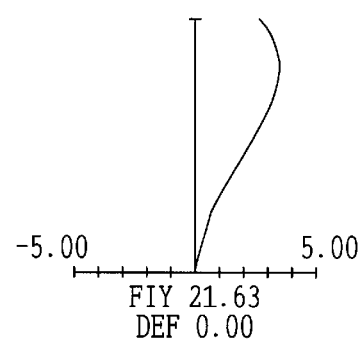
Figure 6D:
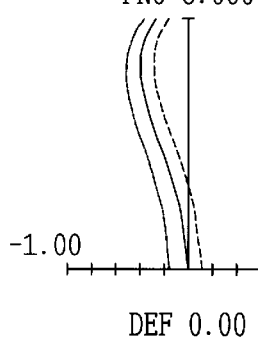
Figure 6E:
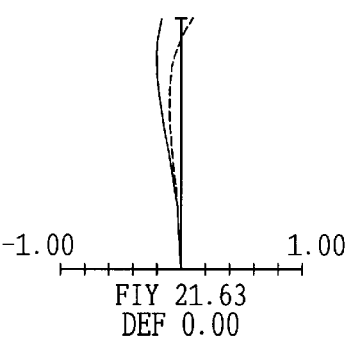
Figure 6F:
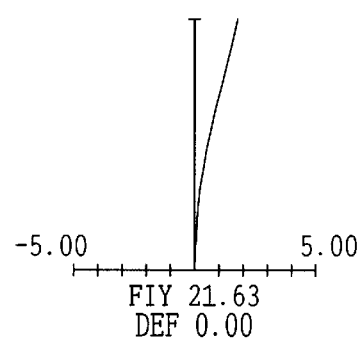
Figure 6G:
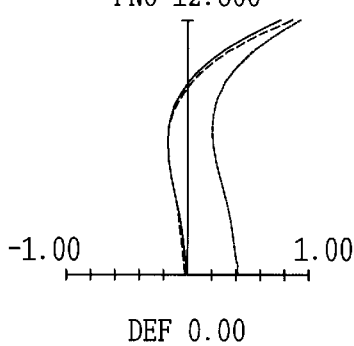
Figure 6H:
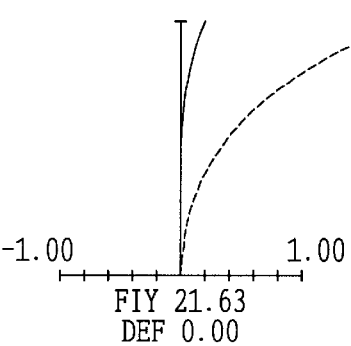
Figure 6I:
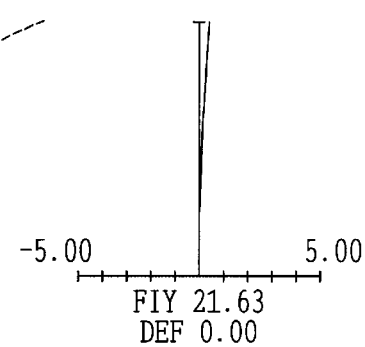

As shown in FIG. 5A, the first lens unit G1 consists of, in order from the object side, a first lens component U1 having a positive refracting power, a second lens component U2 having a negative refracting power, and a third lens component U3 having a positive refracting power. The first lens component U1 consists of a positive lens element L11, the object-side surface thereof being convex toward the object side. The second lens component U2 consists of a cemented-lens component having a negative lens element L12 and a positive lens element L13. The third lens component U3 consists of a cemented-lens component having a positive lens element L14 and a negative lens element L15.

The second lens unit G2 consists of, in order from the object side, a positive lens element L21, a negative lens element L22, and a negative lens element L23.

As shown in FIGS. 5A–5C, in variable magnification change from the wide-angle end through the telephoto end, the first lens unit G1 and the second lens unit G2 are configured to move toward the object side in such a manner that the space between them decreases.

Also, an aperture stop S is disposed on the image-surface side of the first lens unit G1. In variable magnification change, the aperture stop S is integrally moved with the first lens unit G1.

Also, the positive lens element L21 has aspherical surfaces on both sides.

Numerical data 3

$r_1 = 17.8941$
  $d_1 = 2.6996$    $n_{d1} = 1.56384$    $v_{d1} = 60.67$
$r_2 = 844.3921$
  $d_2 = 1.5000$
$r_3 = -16.2341$
  $d_3 = 3.0999$    $n_{d3} = 1.83481$    $v_{d3} = 42.72$
$r_4 = 26.6000$
  $d_4 = 3.7093$    $n_{d4} = 1.48749$    $v_{d4} = 70.23$
$r_5 = -13.0263$
  $d_5 = 0.2000$
$r_6 = 53.0097$
  $d_6 = 3.1619$    $n_{d6} = 1.54072$    $v_{d6} = 47.23$
$r_7 = -10.6690$
  $d_7 = 1.6000$    $n_{d7} = 1.81600$    $v_{d7} = 46.62$
$r_8 = -17.7000$
  $d_8 = 1.0000$
$r_9 = \infty$ (stop)
  $d_9 = D9$
$r_{10} = -36.2094$ (aspherical)
  $d_{10} = 2.8520$    $n_{d10} = 1.58423$    $v_{d10} = 30.49$
$r_{11} = -22.0119$ (aspherical)
  $d_{11} = 2.6385$
$r_{12} = -10.1006$
  $d_{12} = 1.3000$    $n_{d12} = 1.52542$    $v_{d12} = 55.78$
$r_{13} = -15.3934$
  $d_{13} = 2.9406$
$r_{14} = -10.4837$
  $d_{14} = 1.5000$    $n_{d14} = 1.72916$    $v_{d14} = 54.68$
$r_{15} = -32.0284$ Aspherical coefficients 10th surface $K = 0$
$A_4 = 1.0801 \times 10^{-4}$    $A_6 = -9.9814 \times 10^{-7}$
$A_8 = 2.1610 \times 10^{-8}$    $A_{10} = -1.8577 \times 10^{-10}$ 11th surface $K = 0$
$A_4 = -5.1159 \times 10^{-7}$    $A_6 = -1.7303 \times 10^{-6}$
$A_8 = 1.9012 \times 10^{-8}$    $A_{10} = -2.6971 \times 10^{-10}$ Zoom data

|  | wide-angle end | intermediate | telephoto end |
|---|---|---|---|
| focal length | 39.28 | 68.8 | 120.82 |
| FNO. | 5.6 | 8.0 | 12.8 |
| D9 | 10.03 | 4.8 | 1.81 |

Fourth Embodiment

In reference to FIGS. 7A–7C and the numerical data 4 below, a zoom optical system according to the fourth embodiment of the present invention is described. The zoom optical system of the fourth embodiment is configured to correspond to the first, second, fifth and sixth aspects. Aberration diagrams are shown in FIGS. 8A–8I.

As shown in FIG. 7A, the first lens unit G1 consists of, in order from the object side, a first lens component U1 having a positive refracting power, a second lens component U2 having a negative refracting power, and a third lens component U3 having a positive refracting power. The first lens component U1 consists of a positive lens element L11, the object-side surface thereof being convex toward the object side. The second lens component U2 consists of a cemented-lens component having a negative lens element L12 and a positive lens element L13. The third lens component U3 consists of a cemented-lens component having a negative lens element L14 and a positive lens element L15.

The second lens unit G2 consists of, in order from the object side, a positive lens element L21, a negative lens element L22, and a negative lens element L23. The negative lens element L23 is constructed of a meniscus lens directing the convex surface thereof toward the image side.

As shown in FIGS. 7A–7C, in variable magnification change from the wide-angle end through the telephoto end, the first lens unit G1 and the second lens unit G2 are configured to move toward the object side in such a manner that the space between them decreases.

Also, an aperture stop S is disposed on the image-surface side of the first lens unit G1. In variable magnification change, the aperture stop S is integrally moved with the first lens unit G1.

Also, the positive lens element L21 has aspherical surfaces on both sides.

Numerical data of optical members constituting the zoom optical system according to this embodiment is shown below.

Numerical data 4

$r_1 = 17.6916$
  $d_1 = 2.5097$    $n_{d1} = 1.64000$    $v_{d1} = 60.07$
$r_2 = 125.8189$
  $d_2 = 1.5000$
$r_3 = -17.3146$
  $d_3 = 1.3000$    $n_{d3} = 1.83481$    $v_{d3} = 42.72$
$r_4 = 19.2560$
  $d_4 = 4.6896$    $n_{d4} = 1.48749$    $v_{d4} = 70.23$
$r_5 = -17.0261$
  $d_5 = 0.3343$
$r_6 = 25.8172$
  $d_6 = 1.3003$    $n_{d6} = 1.81600$    $v_{d6} = 46.62$
$r_7 = 11.6066$
  $d_7 = 3.7788$    $n_{d7} = 1.54072$    $v_{d7} = 47.23$
$r_8 = -16.9552$
  $d_8 = 1.0000$
$r_9 = \infty$ (stop)
  $d_9 = D9$
$r_{10} = -50.5627$ (aspherical)
  $d_{10} = 2.1000$    $n_{d11} = 1.58423$    $v_{d10} = 30.49$
$r_{11} = -34.5187$ (aspherical)
  $d_{11} = 3.6221$
$r_{12} = -10.0258$
  $d_{12} = 1.3676$    $n_{d12} = 1.48749$    $v_{d12} = 70.23$
$r_{13} = -15.5406$
  $d_{13} = 1.9881$
$r_{14} = -11.5945$
  $d_{14} = 1.5000$    $n_{d14} = 1.72916$    $v_{d14} = 54.68$
$r_{15} = -32.3698$ Aspherical coefficients 10th surface $K = 0$
$A_4 = 1.3507 \times 10^{-4}$    $A_6 = 1.5016 \times 10^{-6}$
$A_8 = -2.4143 \times 10^{-8}$    $A_{10} = 2.3236 \times 10^{-10}$ -continued Numerical data 4

11th surface

K = 0
$A_4 = 4.2314 \times 10^{-5}$     $A_6 = 6.3704 \times 10^{-7}$
$A_8 = -1.3199 \times 10^{-8}$    $A_{10} = 1.1577 \times 10^{-10}$ Zoom data

|  | wide-angle end | intermediate | telephoto end |
|---|---|---|---|
| focal length | 39.32 | 68.8 | 120.63 |
| FNO. | 5.6 | 8.0 | 12.8 |
| D9 | 10.41 | 4.97 | 1.7 |

Fifth Embodiment

In reference to FIGS. 9A–9C and the numerical data 5 below, a zoom optical system according to the fifth embodiment of the present invention is described. The zoom optical system of the fifth embodiment is configured to correspond to the first, fourth, fifth and sixth aspects. Aberration diagrams are shown in FIGS. 10A–10I.

The first lens unit G1 consists of, in order from the object side, a first lens component U1 having a positive refracting power, a second lens component U2 having a negative refracting power, and a third lens component U3 having a positive refracting power. The first lens component U1 consists of a positive lens element L11. The second lens component U2 consists of a cemented-lens component having a negative lens element L12 and a positive lens element L13. The third lens component U3 consists of a cemented-lens component having a negative lens element L14 and a positive lens element L15.

The second lens unit G2 consists of, in order from the object side, a negative lens element L21 and a negative lens element L22.

Figures 9A, 9B, 9C:
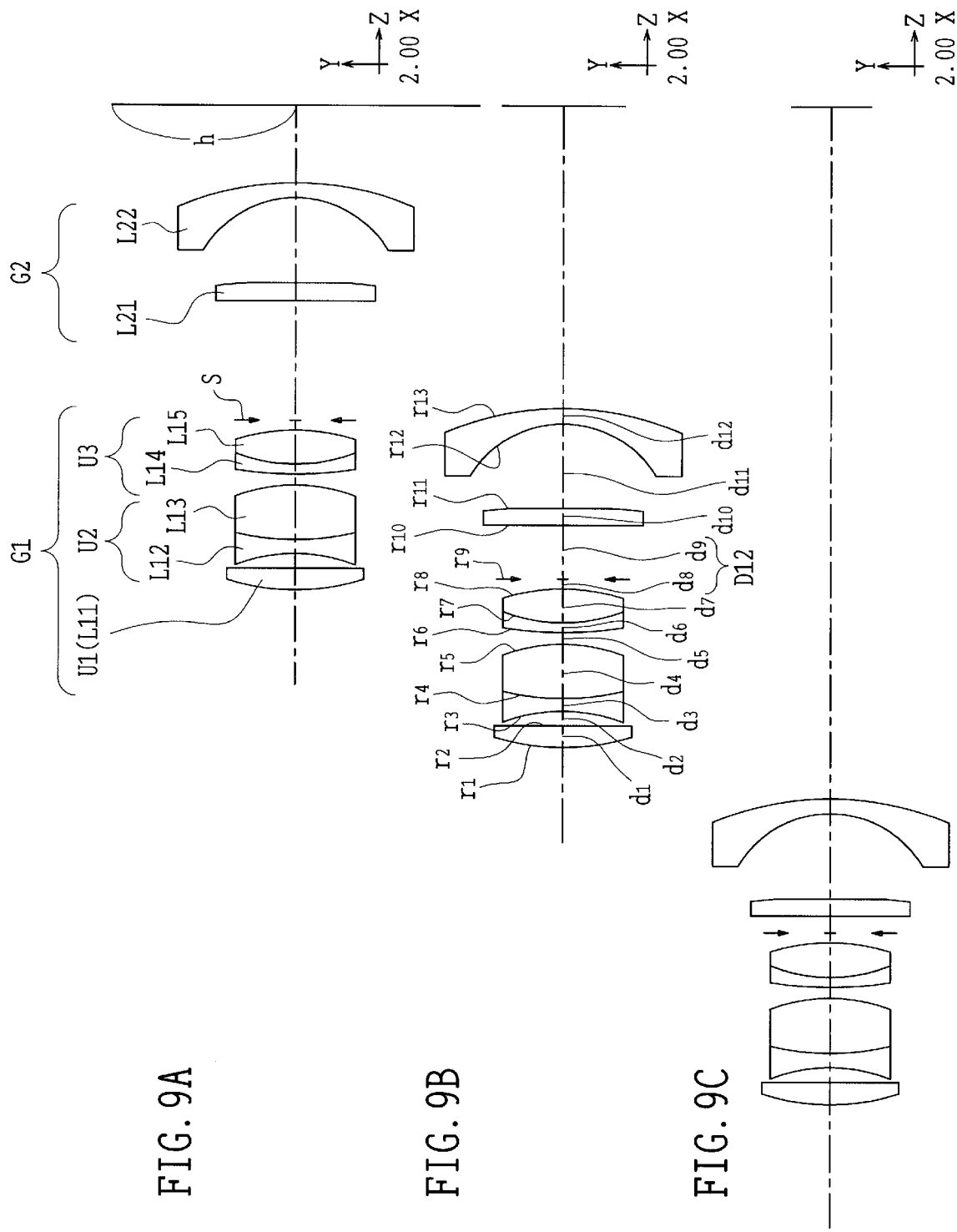
FIGS. 9A–9C are sectional views of a lens configuration of a zoom optical system according to the fifth embodiment of the present invention, taken along the optical axis.
Figure 10A:
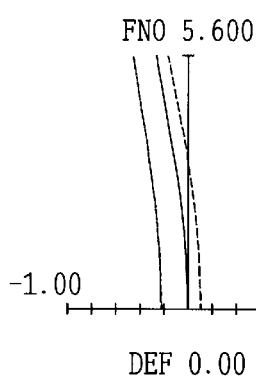
FIGS. 10A–10I are aberration diagrams of the fifth embodiment.
Figure 10B:
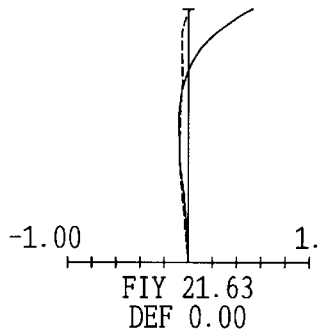
Figure 10C:
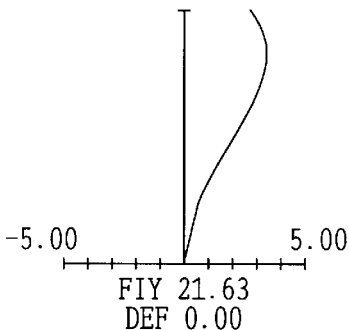
Figure 10D:
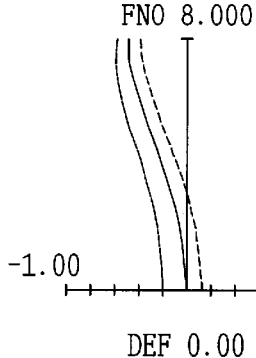
Figure 10E:
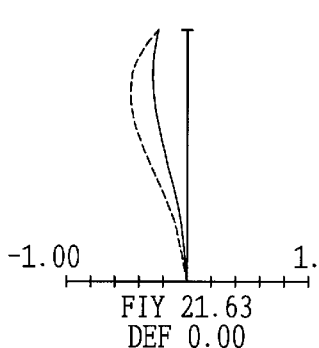
Figure 10F:
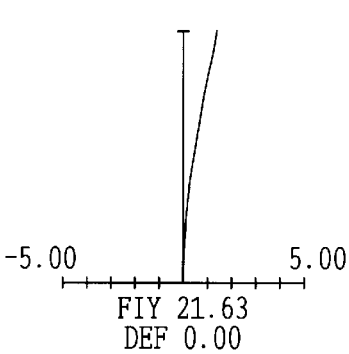
Figure 10G:
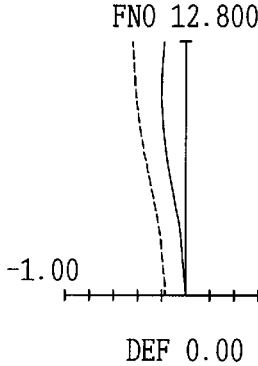
Figure 10H:
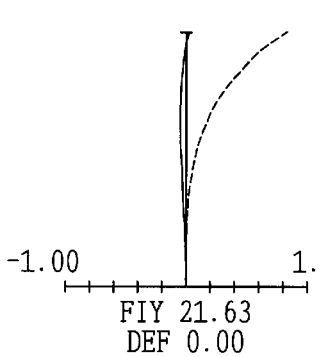
Figure 10I:
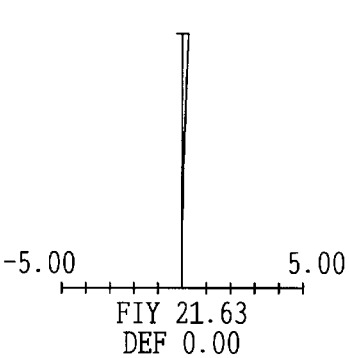

As shown in FIGS. 9A–9C, in variable magnification change from the wide-angle end through the telephoto end, the first lens unit G1 and the second lens unit G2 are configured to move toward the object side in such a manner that the space between them decreases.

Also, an aperture stop S is disposed on the image-surface side of the first lens unit G1. In variable magnification change, the aperture stop S is integrally moved with the first lens unit G1.

Also, the negative lens element L21 has an aspherical surface on the image side.

Numerical data of optical members constituting the zoom optical system according to this embodiment is shown below.

Numerical data 5

$r_1 = 20.5506$
    $d_1 = 2.2000$     $n_{d1} = 1.62230$     $v_{d1} = 53.17$
$r_2 = 116.0868$
    $d_2 = 1.5247$
$r_3 = -17.6875$
    $d_3 = 1.4040$     $n_{d3} = 1.83400$     $v_{d3} = 37.16$
$r_4 = 22.7073$
    $d_4 = 5.5857$     $n_{d4} = 1.48749$     $v_{d4} = 70.23$
$r_5 = -17.5452$
    $d_5 = 1.1363$

-continued

Numerical data 5

$r_6 = 33.1400$
    $d_6 = 1.0000$     $n_{d6} = 1.83400$     $v_{d6} = 37.16$
$r_7 = 14.5848$
    $d_7 = 3.5547$     $n_{d7} = 1.60342$     $v_{d7} = 38.03$
$r_8 = -21.2823$
    $d_8 = 1.0000$
$r_9 = \infty$ (stop)
    $d_9 = D9$
$r_{10} = 430.3596$
    $d_{10}\ 1.8046$     $n_{d10} = 1.52542$     $v_{d10} = 55.78$
$r_{11} = 329.2117$ (aspherical)
    $d_{11} = 8.3874$
$r_{12} = -10.6900$
    $d_{12} = 1.5000$     $n_{d12} = 1.77250$     $v_{d12} = 49.60$
$r_{13} = -31.3627$ Aspherical coefficients 11th surface K = 0
$A_4 = -5.7519 \times 10^{-5}$     $A_6 = -1.8709 \times 10^{-7}$
$A_8 = -4.4480 \times 10^{-9}$     $A_{10} = 1.1838 \times 10^{-11}$ Zoom data

|  | wide-angle end | intermediate | telephoto end |
|---|---|---|---|
| focal length | 39.33 | 68.8 | 120.63 |
| FNO. | 5.6 | 8.0 | 12.8 |
| D9 | 12 | 5.56 | 1.85 |

Sixth Embodiment

In reference to FIGS. 11A–11C and the numerical data 6 below, a zoom optical system according to the sixth embodiment of the present invention is described. The zoom optical system of the sixth embodiment is configured to correspond to the first, fourth, fifth and sixth aspects, and has a basic structure same as the fifth embodiment. Aberration diagrams are shown in FIGS. 10A–10I.

Numerical data of optical members constituting the zoom optical system according to this embodiment is shown below.

Numerical data 6

$r_1 = 20.2412$
    $d_1 = 2.2000$     $n_{d1} = 1.62230$     $v_{d1} = 53.17$
$r_2 = 103.1206$
    $d_2 = 1.5310$
$r_3 = -17.9651$
    $d_3 = 1.4040$     $n_{d3} = 1.83400$     $v_{d3} = 37.16$
$r_4 = 22.6100$
    $d_4 = 5.5674$     $n_{d4} = 1.48749$     $v_{d4} = 70.23$
$r_5 = -17.7250$
    $d_5 = 1.1810$
$r_6 = 32.3186$
    $d_6 = 1.0000$     $n_{d6} = 1.83400$     $v_{d6} = 37.16$
$r_7 = 14.2711$
    $d_7 = 3.5854$     $n_{d7} = 1.60342$     $v_{d7} = 38.03$
$r_8 = -21.4113$
    $d_8 = 1.0000$
$r_9 = \infty$ (stop)
    $d_9 = D9$
$r_{10} = 635.4266$
    $d_{10} = 1.8213$     $n_{d10} = 1.52542$     $v_{d10} = 55.78$
$r_{11} = 322.6434$ (aspherical)
    $d_{11} = 8.3558$ -continued Numerical data 6

$r_{12} = -10.5039$
    $d_{12} = 1.5000$    $n_{d12} = 1.77250$    $v_{d12} = 49.60$
$r_{13} = -29.3897$

Aspherical coefficients

11th surface $K = 0$
$A_4 = -5.5507 \times 10^{-5}$     $A_6 = -4.7376 \times 10^{-7}$
$A_8 = 4.5431 \times 10^{-10}$     $A_{10} = -2.0517 \times 10^{-11}$ Zoom data

|  | wide-angle end | intermediate | telephoto end |
|---|---|---|---|
| focal length | 39.33 | 68.8 | 120.62 |
| FNO. | 5.6 | 8.0 | 12.8 |
| D9 | 11.98 | 5.55 | 1.86 |

TABLE 1

|  | $f_T/f_W$ | $L_T/f_T$ | $N_{L23}$ | $f_T/f_1$ | $f_T/f_2$ | $D_{12}/f_W$ | $D_{12}/h$ | $N_{1N}$ |
|---|---|---|---|---|---|---|---|---|
| 1st embodiment | 3.15 | 0.839 | 1.772 | 4.38 | −5.53 | 0.034 | 0.062 | 1.834 |
| 2nd embodiment | 3.11 | 0.844 | 1.734 | 4.5 | −5.77 | 0.038 | 0.069 | 1.8348 |
| 3rd embodiment | 3.07 | 0.815 | 1.729 | 4.75 | −6.42 | 0.038 | 0.069 | 1.8348 |
| 4th embodiment | 3.06 | 0.816 | 1.729 | 4.7 | −6.2 | 0.038 | 0.069 | 1.8348 |
| 5th embodiment | 3.06 | 0.845 | — | 4.37 | −5.61 | 0.038 | 0.07 | 1.834 |
| 6th embodiment | 3.06 | 0.845 | 1.7725 | 4.37 | −5.63 | 0.039 | 0.07 | 1.834 |

Figure 13:
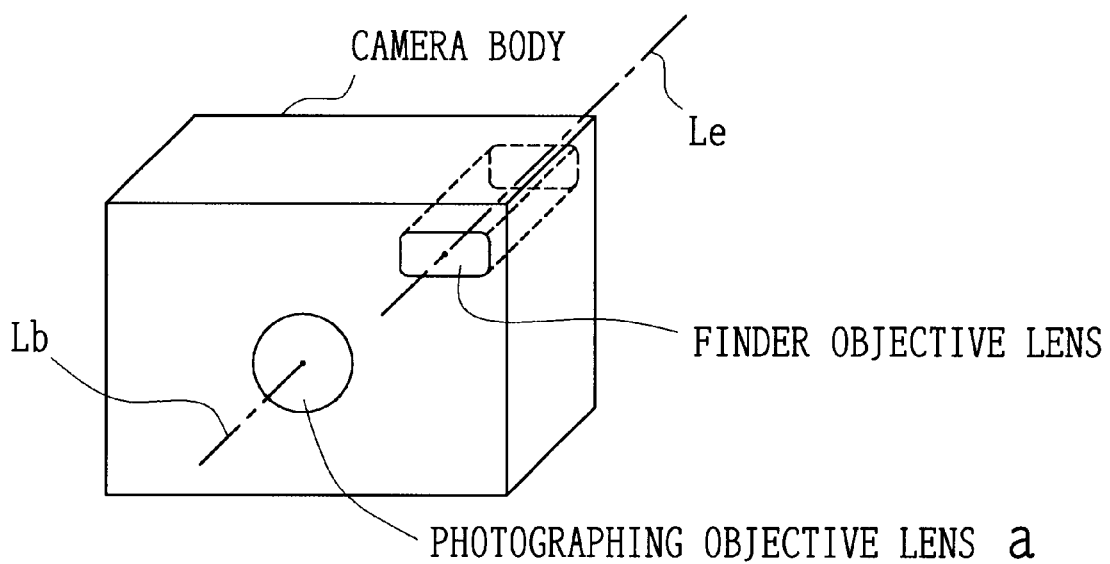
FIG. 13 is a schematic perspective view showing an example of a camera that employs a zoom optical system according to the present invention.
Figure 14:
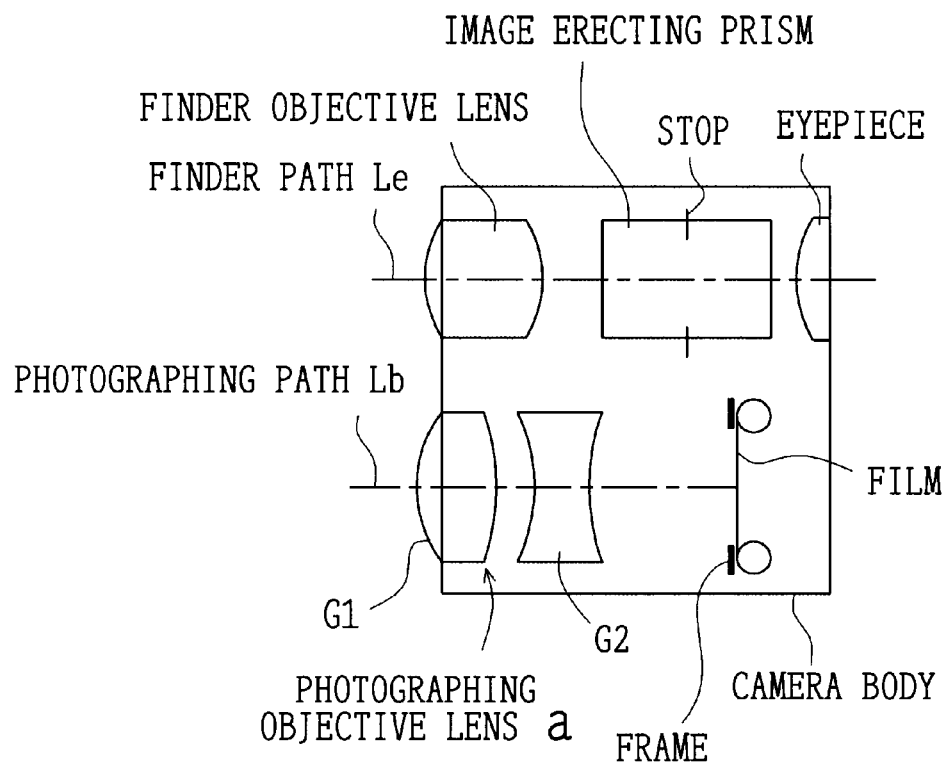
FIG. 14 is a sectional view of the camera of FIG. 14 showing the schematic configuration inside.

The zoom optical system according to the present invention as described above is used as an objective lens a for a photographing camera, which is configured as shown in FIG. 13 in a perspective view and FIG. 14 in a sectional view.

In FIG. 13, the reference symbol G1 represents the first lens unit having a positive refracting power and the reference symbol G2 represents the second lens unit having a negative refracting power. Also, the reference symbol Lb represents the photographing path, and the reference symbol Le represents the finder path. The photographing path Lb and the finder path Le are arranged in parallel. An image of the object is observed via a finder constructed of a finder objective lens, an image erecting prism, a stop, and an eyepiece, while being imaged by the photographing objective lens a on a film.

Figure 15:
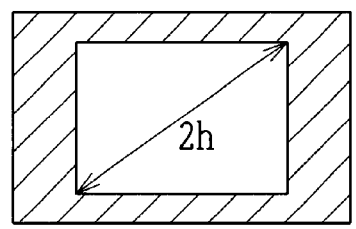
FIG. 15 is an explanatory view to indicate diagonal length of the frame of a camera.

In this configuration, a frame having a quadrangular opening as shown in FIG. 15 for regulating the photographing range is disposed directly before the film. The diagonal length of the frame is represented by 2h.

Also, the zoom optical system according to the present invention may be used as a photographing objective lens for a compact electronic camera, which is configured to use an electronic image pickup device such as a CCD in place of a film. In this case, a positive lens may be disposed directly before the image pickup surface of the image pickup device so that off-axial and axial chief rays are incident on the image pickup device substantially perpendicularly.

Here, the diagonal length of the maximum effective photographing field is 2h.

As discussed above, according to the zoom optical system of the present invention, a compact zoom optical system of two-unit configuration that achieves good imaging performance with a variable magnification ratio greater than 3 and a telephoto ratio smaller than 0.85 can be provided.

What is claimed is:

1. A zoom optical system comprising a lens system, said lens system consisting of, in order from an object side:

a first lens unit having a positive refracting power; and
a second lens unit having a negative refracting power,
in variable magnification change from a wide-angle end position through a telephoto end position, each of said first lens unit and said second lens unit being moved toward the object side in such a manner that a space between said first lens unit and said second lens unit decreases,
wherein said first lens unit consists of, in order from the object side, a first lens component having a positive refracting power, a second lens component having a negative refracting power, and a third lens component having a positive refracting power, said third lens component consisting of one cemented-lens component, and
wherein the following condition is satisfied:

$f_T/f_W > 3$ where $f_T$ is a focal length of the entire zoom optical system in the telephoto end position, and $f_W$ is a focal length of the entire zoom optical system in the wide-angle end position.

2. A zoom optical system comprising a lens system, said lens system consisting of, in order from an object side:

a first lens unit having a positive refracting power; and
a second lens unit having a negative refracting power,
in variable magnification change from a wide-angle end position through a telephoto end position, each of said first lens unit and said second lens unit being moved toward the object side in such a manner that a space between said first lens unit and said second lens unit decreases,
wherein said first lens unit consists of, in order from the object side, a first lens component having a positive refracting power, a second lens component having a negative refracting power, and a third lens component having a positive refracting power, said third lens component consisting of one cemented-lens component,
wherein said second lens unit comprises at least one positive lens element and two negative lens elements, one of said negative lens elements being a negative meniscus lens that is disposed on a most image side with a convex surface thereof being directed toward an image side, and wherein the following conditions are satisfied:

$$L_T/f_T<0.85$$

$$1.67<N_{L23}$$

where $L_T$ is a total length of the entire zoom optical system in the telephoto end position, $f_T$ is a focal length of the entire zoom optical system in the telephoto end position, and $N_{L23}$ is a refractive index of said negative lens element disposed on the most image side in said second lens unit.

3. A zoom optical system comprising a lens system, said lens system consisting of, in order from an object side:
   a first lens unit having a positive refracting power; and
   a second lens unit having a negative refracting power,
   in variable magnification change from a wide-angle end position through a telephoto end position, each of said first lens unit and said second lens unit being moved toward the object side in such a manner that a space between said first lens unit and said second lens unit decreases,
   wherein said first lens unit consists of, in order from the object side, a first lens component having a positive refracting power, a second lens component having a negative refracting power, and a third lens component having a positive refracting power, said third lens component having at least one negative lens element, and
   wherein said second lens unit consists of, in order from the object side, a lens element having a negative refracting power, a lens element having a positive refracting power, and a lens element having a negative refracting power.

4. A zoom optical system comprising a lens system, said lens system consisting of, in order from an object side:
   a first lens unit having a positive refracting power; and
   a second lens unit having a negative refracting power,
   in variable magnification change from a wide-angle end position through a telephoto end position, each of said first lens unit and said second lens unit being moved toward the object side in such a manner that a space between said first lens unit and said second lens unit decreases,
   wherein said first lens unit consists of, in order from the object side, a first lens component having a positive refracting power, a second lens component having a negative refracting power, and a third lens component having a positive refracting power, said third lens component consisting of one cemented-lens component, and
   wherein said second lens unit consists of, in order from the object side, a lens element (L21) having a negative refracting power and a lens element (L22) having a negative refracting power, said lens element (L21) having at least one aspherical surface.

5. A zoom optical system comprising a lens system, said lens system consisting of, in order from an object side:
   a first lens unit having a positive refracting power; and
   a second lens unit having a negative refracting power,
   in variable magnification change from a wide-angle end position through a telephoto end position, each of said first lens unit and said second lens unit being moved toward the object side in such a manner that a space between said first lens unit and said second lens unit decreases,
   wherein said first lens unit consists of, in order from the object side:
   a single-lens component consisting of a lens element (L11) having a positive refracting power;
   a lens component consisting of a lens element (L12) having a negative refracting power and a lens element (L13) having a positive refracting power cemented together; and
   a lens component consisting of a lens element (L14) having a negative refracting power and a lens element (L15) having a positive refracting power cemented together, and
   wherein said second lens unit comprises at least two negative lens elements and has at least one aspherical surface.

6. A zoom optical system comprising a lens system, said lens system consisting of, in order from an object side:
   a first lens unit having a positive refracting power; and
   a second lens unit having a negative refracting power,
   in variable magnification change from a wide-angle end position through a telephoto end position, each of said first lens unit and said second lens unit being moved toward the object side in such a manner that a space between said first lens unit and said second lens unit decreases,
   wherein said first lens unit comprises:
   a single-lens component arranged on a most object side and consisting of a positive lens element with an object-side surface thereof being convex toward the object side; and
   at least two cemented-lens components each consisting of a positive lens element and a negative lens element cemented together, and
   wherein the following condition is satisfied:

$$f_T/f_W>2.7$$

where $f_T$ is a focal length of the entire zoom optical system in the telephoto end position and $f_W$ is a focal length of the entire zoom optical system in the wide-angle end position.

7. A camera for photographing using a film, comprising:
   a zoom optical system according to claim 1, 2, 3, 4, 5 or 6; and
   a frame, which limits a photographing field, arranged on an image side of said zoom optical system.

8. A camera for photographing using an electronic image, comprising:
   a zoom optical system according to claim 1, 2, 3, 4, 5 or 6; and
   an electronic image pickup device, which limits a photographing field, arranged on an image side of said zoom optical system.

9. A zoom optical system according to claim 1, wherein the following condition is satisfied:

$$1.7<N_{L23}$$

where $N_{L23}$ is a refractive index of a negative lens element that is disposed on a most image side in said second lens unit.

10. A zoom optical system according to claim 1 or 2, wherein the following conditions are satisfied:

$$3.8<f_T/f_1<5.5$$

$$-7.0<f_T/f_2<-5.0$$

where $f_1$ is a focal length of said first lens unit, and $f_2$ is a focal length of said second lens unit.

11. A zoom optical system according to claim 1 or 2, wherein the following condition is satisfied:

$$0.02 < D_{12}/f_W < 0.06$$

where $D_{12}$ is a space between said first lens component and said second lens component, and $f_W$ is a focal length of the entire zoom optical system in the wide-angle end position.

12. A zoom optical system according to claim 1 or 2, wherein said second lens unit includes a plastic lens element that has at least one aspherical surface.

13. A zoom optical system according to claim 1 or 2, wherein the following condition is satisfied:

$$0.03 < D_{12}/f_W < 0.05$$

where $D_{12}$ is a space between said first lens component and said second lens component, and $f_W$ is a focal length of the entire zoom optical system in the wide-angle end position.

14. A zoom optical system according to claim 1 or 2, wherein the following condition is satisfied:

$$N_{1N} > 1.8$$

where $N_{1N}$ is a refractive index of any negative lens element in said first lens unit.

15. A zoom optical system according to claim 1 or 2, wherein the following condition is satisfied:

$$0.05 < D_{12}/h < 0.1$$

where $D_{12}$ is a space between said first lens component and said second lens component, and h is a maximum image height on an image surface.

16. A zoom optical system according to claim 3 or 4, wherein said second lens unit includes a plastic lens element that has at least one aspherical surface.

17. A zoom optical system according to claim 3 or 4, wherein the following conditions are satisfied:

$$3.8 < f_T/f_1 < 5.5$$

$$-7.0 < f_T/f_2 < -5.0$$

where $f_T$ is a focal length of the ten tire zoom optical system in the telephoto end position, $f_1$ is a focal length of said first lens unit, and $f_2$ is a focal length of said second lens unit.

18. A zoom optical system according to claim 3 or 4, wherein the following condition is satisfied:

$$0.02 < D_{12}/f_W < 0.06$$

where $D_{12}$ is a space between said first lens component and said second lens component, and $f_W$ is a focal length of the entire zoom optical system in the wide-angle end position.

19. A zoom optical system according to claim 3 or 4, wherein the following condition is satisfied:

$$N_{1N} > 1.8$$

where $N_{1N}$ is a refractive index of any negative lens element in said first lens unit.

20. A zoom optical system according to claim 3 or 4, wherein the following condition is satisfied:

$$L_T/f_T < 0.85$$

where $L_T$ is a total length of the entire zoom optical system in the telephoto end position, and $f_T$ is a focal length of the entire zoom optical system in the telephoto end position.

21. A zoom optical system according to claim 5, wherein the following conditions are satisfied:

$$3.8 < f_T/f_1 < 5.5$$

$$-7.0 < f_T/f_2 < -5.0$$

where $f_T$ is a focal length of the entire zoom optical system in the telephoto end position, $f_1$ is a focal length of said first lens unit, and $f_2$ is a focal length of said second lens unit.

22. A zoom optical system according to claim 5, wherein said first lens unit consists of, in order from the object side, a first lens component having a positive refracting power and consisting of a lens element, a second lens component having a negative refracting power and consisting of a cemented-lens component, and a third lens component having a positive refracting power and consisting of a cemented-lens component, and wherein the following condition is satisfied:

$$0.02 < D_{12}/f_W < 0.06$$

where $D_{12}$ is a space between said first lens component and said second lens component, and $f_W$ is a focal length of the entire zoom optical system in the wide-angle end position.

23. A zoom optical system according to claim 5, wherein said second lens unit includes a plastic lens element having at least one aspherical surface.

24. A zoom optical system according to claim 5, wherein the following condition is satisfied:

$$N_{1N} > 1.8$$

where $N_{1N}$ is a refractive index of any negative lens element in said first lens unit.

25. A zoom optical system according to claim 5, wherein the following condition is satisfied:

$$L_T/f_T < 0.85$$

where $L_T$ is a total length of the entire zoom optical system in the telephoto end position, and $f_T$ is a focal length of the entire zoom optical system in the telephoto end position.

26. A zoom optical system according to claim 6, wherein the following conditions are satisfied:

$$3.8 < f_T/f_1 < 5.5$$

$$-7.0 < f_T/f_2 < -5.0$$

where $f_1$ is a focal length of said first lens unit, and $f_2$ is a focal length of said second lens unit.

27. A zoom optical system according to claim 6, wherein said first lens unit consists of, in order from the object side, a first lens component having a positive refracting power and consisting of a lens element, a second lens component having a negative refracting power and consisting of a cemented-lens component, and a third lens component having a positive refracting power and consisting of a cemented-lens component, and wherein the following condition is satisfied:

$$0.05 < D_{12}/h < 0.1$$

where $D_{12}$ is a space between said first lens component and said second lens component, and h is a maximum image height on an image surface.

28. A zoom optical system according to claim 6, wherein said second lens unit includes a plastic lens element having at least one aspherical surface.

29. A zoom optical system according to claim 6, wherein the following condition is satisfied:

$$N_{1N} > 1.8$$

where $N_{1N}$ is a refractive index of any negative lens element in said first lens unit.

30. A zoom optical system according to claim 6, wherein the following condition is satisfied:

$$L_T/f_T < 0.85$$

where $L_T$ is a total length of the entire zoom optical system in the telephoto end position.

* * * * *